(12) United States Patent
Nishihara

(10) Patent No.: US 6,970,478 B1
(45) Date of Patent: Nov. 29, 2005

(54) PACKET TRANSFER METHOD AND APPARATUS, AND PACKET COMMUNICATION SYSTEM

(75) Inventor: Motoo Nishihara, Tokyo (JP)

(73) Assignee: NEC Corporation, Tokyo (JP)

( * ) Notice: Subject to any disclaimer, the term of this patent is extended or adjusted under 35 U.S.C. 154(b) by 810 days.

(21) Appl. No.: 09/580,559

(22) Filed: May 30, 2000

(30) Foreign Application Priority Data

Jun. 1, 1999 (JP) .................................. 11/154308

(51) Int. Cl.$^7$ .............................................. H04J 3/24
(52) U.S. Cl. ..................................................... 370/474
(58) Field of Search .............................. 370/235, 238, 370/238.1, 400, 401, 428, 429, 473, 474, 370/477, 465, 468, 412, 475, 527, 528, 529

(56) References Cited

U.S. PATENT DOCUMENTS

| | | | |
|---|---|---|---|
| 4,930,122 A * | 5/1990 | Takahashi et al. | 370/473 |
| 5,375,121 A * | 12/1994 | Nishino et al. | 370/473 |
| 5,936,965 A * | 8/1999 | Doshi et al. | 370/469 |
| 6,075,789 A * | 6/2000 | Kasslin et al. | 370/338 |
| 6,172,972 B1 * | 1/2001 | Birdwell et al. | 370/349 |
| 6,233,251 B1 * | 5/2001 | Kurobe et al. | 370/471 |
| 6,247,058 B1 * | 6/2001 | Miller et al. | 709/234 |
| 6,272,128 B1 * | 8/2001 | Pierson, Jr. | 370/352 |
| 6,477,164 B1 * | 11/2002 | Vargo et al. | 370/356 |
| 6,574,226 B1 * | 6/2003 | Nakano et al. | 370/395.64 |

FOREIGN PATENT DOCUMENTS

| | | |
|---|---|---|
| JP | S61-296838 A | 12/1986 |
| JP | S62-233951 A | 10/1987 |
| JP | 63-197148 | 8/1988 |
| JP | 63-197148 A | 8/1988 |
| JP | 2-195756 A | 8/1990 |
| JP | H02-195756 A | 8/1990 |
| JP | 7-245628 | 9/1995 |
| JP | 10-336249 A | 12/1998 |
| JP | H11-122307 A | 4/1999 |
| JP | 3391291 B2 | 1/2003 |
| WO | 96/26589 | 8/1996 |

* cited by examiner

Primary Examiner—Kwang Bin Yao
(74) Attorney, Agent, or Firm—Sughrue Mion, PLLC

(57) ABSTRACT

In a packet transfer method, a packet to be transferred to a destination access network is generated and transmitted to a transmission-source packet transfer apparatus connected to the transmission-source access network. The packet is converted into a superpacket having a length n times (n is an integer of 2 or more) larger than a fixed-length cell as a switching unit of a relay apparatus arranged on a network serving as a backbone, and sent to the network. The superpacket is relayed using the relay apparatus and transferred to a destination packet transfer apparatus connected to the destination access network. The packet generated by the transmission-source access network is reassembled on the basis of the superpacket transferred from the network, and sent to the destination access network. A packet transfer apparatus and packet communication system are also disclosed.

25 Claims, 17 Drawing Sheets

FIG. 4

EXAMPLE OF HEADER OF SUPERPACKET (EXAMPLE FOR IPv4)

| VERSION | IHL | SERVICE TYPE | TOTAL LENGTH | |
|---|---|---|---|---|
| IDENTIFIER (ID) | | | FLAG | FRAGMENT OFFSET |
| TIME TO LIVE (TTL) | | PROTOCOL | HEADER CHECKSUM | |
| TRANSMISSION-SOURCE ADDRESS (DESCRIBING TRANSMISSION-SOURCE EDGE ROUTER ADDRESS) | | | | |
| DESTINATION ADDRESS (DESCRIBING DESTINATION EDGE ROUTER ADDRESS) | | | | |
| OPTION | | | | PADDING |

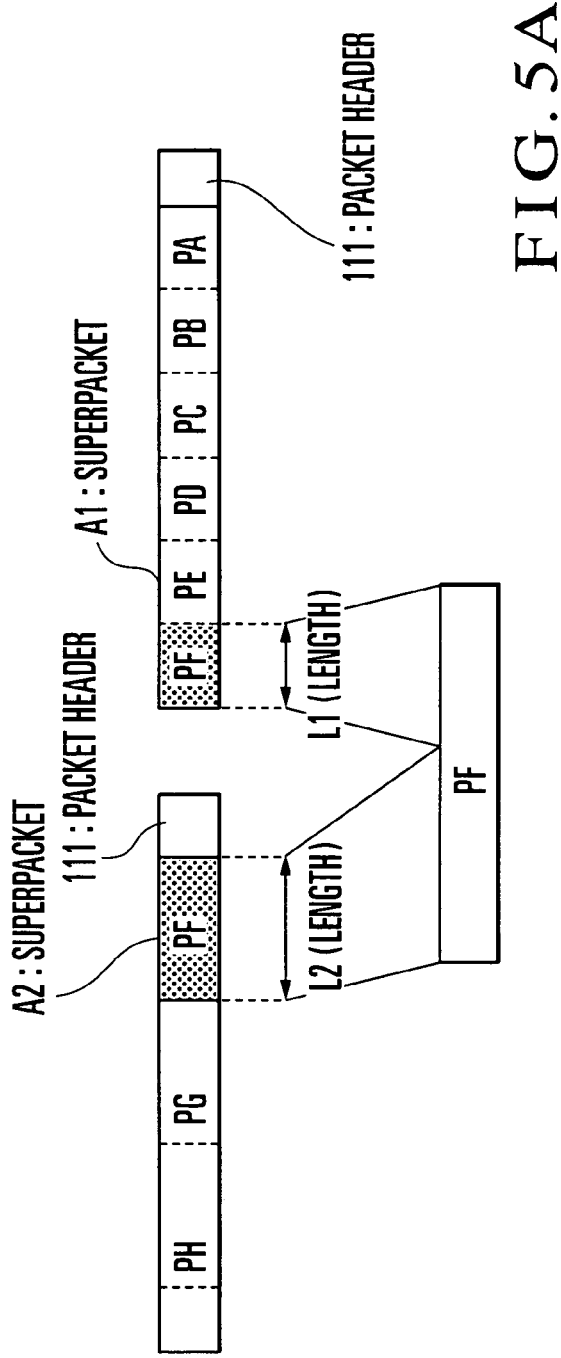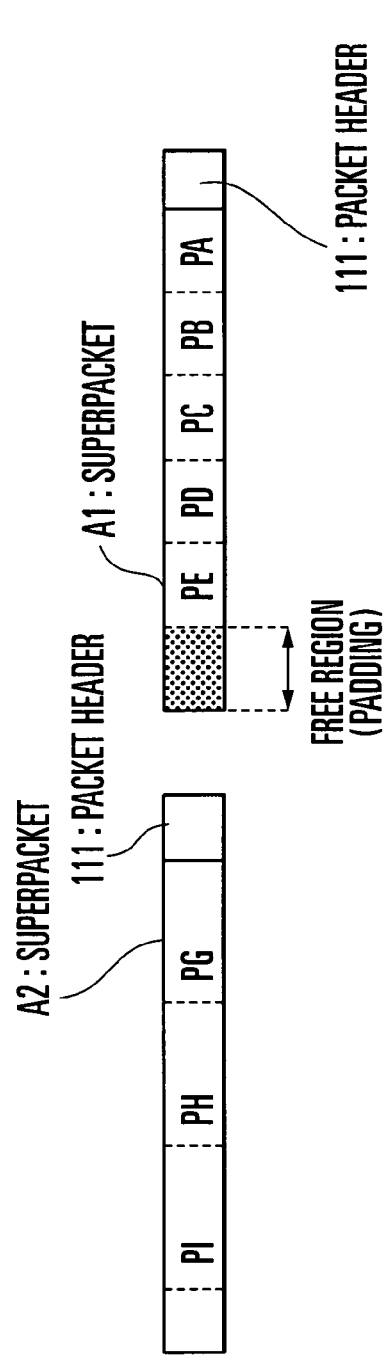
FIG. 5A
FIG. 5B

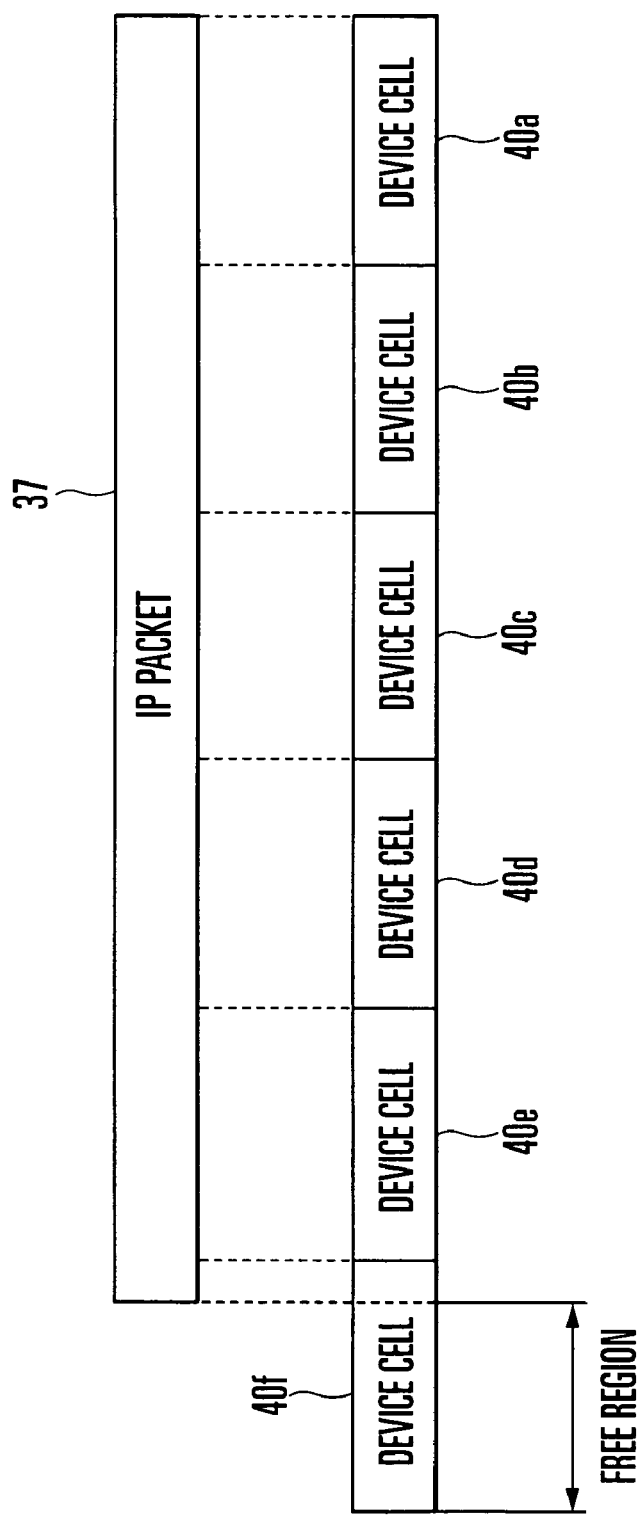

PACKET TRANSFER METHOD AND APPARATUS, AND PACKET COMMUNICATION SYSTEM

BACKGROUND OF THE INVENTION

The present invention relates to a packet transfer method and apparatus and a packet communication system.

(1) Arrangement of Conventional Network

FIG. 15 shows the arrangement of a network conventionally used for packet communication. A description will be made below by exemplifying, as a packet transfer apparatus, a router apparatus for transferring an IP (Internet Protocol) packet. As shown in FIG. 15, a plurality of router apparatuses for relaying a packet are arranged in the network. Four router apparatuses 1a to 1d are exemplified in FIG. 15. These router apparatuses are connected through transmission paths. For example, the router apparatus 1a and router apparatus 1b are connected through a transmission path 2ab. The remaining router apparatuses are connected through transmission paths 2ac, 2ad, 2bc, 2bd, and 2cd. Each router apparatus is connected to one or a plurality of user LANs (Local Area Networks) as an example of an access network. Each router apparatus and the user LANs are connected through access lines. FIG. 15 exemplifies a form in which two user LANs are connected to each router apparatus. For example, user LANs 3a1 and 3a2 are connected to the router apparatus 1a through access lines 4a1 and 4a2, respectively. This also applies to the router apparatuses except the router apparatus 1a: user LANs 3b1 and 3b2, 3c1 and 3c2, and 3d1 and 3d2 are connected to the remaining router apparatuses through access lines 4b1 and 4b2, 4c1 and 4c2, and 4d1 and 4d2, respectively. Each user LAN is connected to one or a plurality of host terminals. FIG. 15 illustrates only a transmission-source host 5a1 and destination host 5d1 connected to the user LANs 3a1 and 3d1, respectively. The remaining host terminals are not shown in FIG. 15.

Assume that an IP packet is to be transmitted from the transmission-source host 5a1 to the destination host 5d1 through a transfer route 6 in the arrangement shown in FIG. 15. On the transmission path or access line, an IP packet is transferred in the form of layer 1 frame. However, in order to avoid cumbersomeness, an expression "an IP packet is transferred on the transmission path or access line" may be used in the following description. When the transfer route 6 is used, an IP packet generated by the transmission-source host 5a1 is converted into the format of layer 1 frame and sent to the user LAN 3a1 and then to the router apparatus 1a through the access line 4a1.

The router apparatus 1a determines the transfer path of the IP packet on the basis of a destination address described in the header of the IP packet in the received layer 1 frame, thereby specifying the router apparatus or user LAN to which the IP packet should be transferred. At the same time, the router apparatus 1a specifies the transmission path or access line as a transfer path corresponding to the specified router apparatus or user LAN. In the example shown in FIG. 15, the transmission path 2ad and router apparatus 1d are specified as the transfer destination of the IP packet. The router apparatus 1a sends the layer 1 frame containing the IP packet onto the transmission path 2ad. The router apparatus 1d transfers the IP packet, like the router apparatus 1a. Consequently, the IP packet is transferred to the user LAN at the destination through the access line 4d1 and finally transferred to the destination host 5d1 in this user LAN.

(2) Arrangement of Conventional Router Apparatus

The arrangement and operation of each router apparatus shown in FIG. 15 will be described next. FIG. 16 shows the arrangement of a router apparatus. The router apparatus comprises one or a plurality of input interface sections 10-1 to 10-N (N: natural number), one or a plurality of output interface sections 11-1 to 11-N, a switch scheduler section 12, and a crossbar switch section 13. Each input interface section comprises a layer 1/2 processing section 14, IP layer processing section 15, packet segmenting section 16, and route search table 17. The input interface sections 10-1 to 10-N are assigned unique input interface numbers "1" to "N", respectively. On the other hand, each output interface section comprises a packet reassembler section 18, IP layer processing section 19, and layer 1/2 processing section 20. The output interface sections 11-1 to 11-N are assigned unique output interface numbers "1" to "N".

One of the transmission paths or access lines shown in FIG. 15 is connected to the layer 1/2 processing section 14 in each input interface section. For example, the layer 1/2 processing section 14 in the input interface section 10-1 is connected to the access line 4a2 shown in FIG. 15, and the layer 1/2 processing section 14 in the input interface section 10-2 is connected to the transmission path 2ac. The layer 1/2 processing section 14 has a function of terminating the layer 1/2 protocol of a transmission path or access line that is to be terminated at the input interface section to which the layer 1/2 processing section 14 belongs, and transfers the terminated IP packet to the IP layer processing section 15.

The IP layer processing section 15 looks up the header of the IP packet transferred from the layer 1/2 processing section 14 and processes the IP layer. A detailed description of this IP layer processing will be omitted herein because it is an existing technique and has no relation to the present invention. The packet segmenting section 16 segments the IP packet transferred from the IP layer processing section 15 into fixed-length device cells defined in the router apparatus and sends the device cells to the crossbar switch section 13. That is, this fixed length corresponds to the length of the switching unit of the router apparatus. Simultaneously, the packet segmenting section 16 sends a transfer request signal 21 to the switch scheduler section 12 to transfer the transferred IP packet to one of the output interface sections 11-1 to 11-N.

The switch scheduler section 12 is a functional block of performing switch setting in the crossbar switch section 13. The transfer request signal 21 and transfer reply signal 22 are exchanged between the switch scheduler section 12 and the packet segmenting section 16 in each of the input interface sections 10-1 to 10-N through a bi-directional signal line. That is, the transfer request signal 21 is sent from the packet segmenting section 16 to the switch scheduler section 12, while the transfer reply signal 22 is sent from the switch scheduler section 12 to the packet segmenting section 16. Upon receiving the transfer request signal 21 transmitted from the packet segmenting section 16, the switch scheduler section 12 calculates optimum switch setting in the crossbar switch section 13 and sends a switch setting signal 23 to the crossbar switch section 13.

The crossbar switch section 13 connects one of the input interface sections 10-1 to 10-N to one of the output interface sections 11-1 to 11-N on the basis of the transmitted switch setting signal 23. In each of the output interface sections 11-1 to 11-N, the packet reassembler section 18 stacks the fixed-length device cells transferred from one of the input interface sections 10-1 to 10-N through the crossbar switch section 13 to reassemble the cells into the original IP packet (i.e., the IP packet terminated by the layer 1/2 processing section 14) and transfers the IP packet to the IP layer processing section 19. The IP layer processing section 19 looks up the header of the IP packet transferred from the packet reassembler section 18 and performs processing associated with the IP layer, and then transfers the IP packet to the layer 1/2 processing section 20.

The layer 1/2 processing section 20 attaches the header of layer 1/2 to the transferred IP packet to construct a layer 1 frame and transfers it to the output path as a transmission path or access line. More specifically, as in the input interface sections 10-1 to 10-N, one of the transmission paths or access lines shown in FIG. 15 is connected to the layer 1/2 processing section 20 in each output interface section. For example, the layer 1/2 processing section 20 in the output interface section 11-1 is connected to the access line 4a2 shown in FIG. 15, and the layer 1/2 processing section 20 in the output interface section 11-2 is connected to the transmission path 2ac.

(3) Operation of Conventional Router Apparatus

A detailed operation of the router apparatus shown in FIG. 16 will be described next in detail. In this case, the signal transmitted on the transmission path or access line shown in FIG. 15 has a format shown in FIG. 17. More specifically, as described above, a layer 1 frame 30 is transmitted on the transmission path or access line. A layer 1 header 31 is periodically inserted into the layer 1 frame 30. With this layer 1 header 31, the function of the layer 1, i.e., the OAM (Operation Administration and Maintenance) function used to monitor bit synchronization, byte synchronization, frame synchronization, line state, or error rate is realized by the layer 1/2 processing section 14.

A layer 2 frame 33 is contained in a layer 1 payload 32. The variable-length layer 2 frame 33 is transferred through this portion. The layer 2 frame 33 is constructed by sandwiching a layer 2 payload 36 by a layer 2 header 34 and layer 2 trailer 35. An IP packet 37 is put on the layer 2 payload 36. The IP packet 37 is constructed by a header 38 and payload 39.

The layer 1/2 processing section 14 shown in FIG. 16 performs layer 1 processing on the signal input from the transmission path or access line and then looks up the layer 2 header 34 and layer 2 trailer 35 contained in the layer 2 frame 33 and executes layer 2 processing. A detailed description of the layer 1 processing and layer 2 processing will be omitted because they are existing techniques and have no direct relation to the present invention. After that, the layer 1/2 processing section 14 extracts the IP packet 37 contained in the layer 2 payload 36 and transfers it to the IP layer processing section 15.

The IP layer processing section 15 looks up the header 38 of the transferred IP packet 37 and executes IP layer processing such as IP header validity determination or abnormal IP packet reception processing. In addition, the route information in the route search table 17 is searched in accordance with the contents of the destination address field contained in the header 38. With this search operation, the IP layer processing section 15 specifies the router apparatus or user LAN to which the IP packet is to be transferred next. Simultaneously, the IP layer processing section 15 specifies the output interface number (i.e., "1" to "N") assigned to one of the output interface sections 11-1 to 11-N, which corresponds to the router apparatus or user LAN, and transfers the IP packet ("data signal" in FIG. 16) and output interface number to the packet segmenting section 16.

The packet segmenting section 16 segments the IP packet 37 transferred from the IP layer processing section 15 into fixed-length device cells 40, as shown in FIG. 17, and stores them in the payload portion. Additionally, the packet segmenting section 16 attaches a cell header 41 to each device cell 40. Not only the output interface number of the transfer destination but also the input interface number (for example, "2" for the packet segmenting section 16 in the input interface section 10-2) assigned to the input interface section of its own as the transmission source is written in the cell header 41.

The packet segmenting section 16 incorporates memories (not shown) in units of output interface numbers. The segmented device cells 40 are stored in a memory corresponding to the output interface number. The packet segmenting section 16 also sends the transfer request signal 21 to the switch scheduler section 12 to transfer the device cells 40 stored in the memory to one of the output interface sections 11-1 to 11-N, which corresponds to the output interface number written in the cell headers 41.

Upon receiving the transfer request signal 21 sent from one of the input interface sections 10-1 to 10-N, the switch scheduler section 12 calculates an appropriate combination of switch connections between the input interface section and the output interface section. Next, the switch scheduler section 12 returns the transfer reply signal 22 to the input interface sections 10-1 to 10-N to notify them of one of the output interface sections 11-1 to 11-N, to which the IP packet 37 is to be transferred. Upon receiving the transfer reply signal 22, the input interface sections 10-1 to 10-N sequentially transfer the device cells 40 having a fixed length to the crossbar switch section 13 to transfer them to the input interface section designed by the transfer reply signal 22. At the same time, the switch scheduler section 12 sends the switch setting signal 23 to the crossbar switch section 13.

On the basis of the received switch setting signal 23, the crossbar switch section 13 performs switch connection between the designated input interface section and the designated output interface section. Thus, the device cells 40 are sequentially transferred from the input interface sections 10-1 to 10-N to the output interface sections 11-1 to 11-N. The packet reassembler section 18 in the designated input interface section stores the device cells 40 transferred from the designated input interface section in one of internal memories (not shown) on the basis of the input interface number described in the cell headers 41. The packet reassembler section 18s stacks the device cells 40 to reassemble the cells into the original IP packet 37 from the payload portions excluding the cell headers 41 of the device cells 40, and transfers the IP packet 37 to the IP layer processing section 19.

The IP layer processing section 19 executes IP layer processing for the received IP packet 37 and then transfers it to the layer 1/2 processing section 20. The layer 1/2 processing section 20 stores the received IP packet 37 in the layer 2 payload 36 and attaches the layer 2 header 34 and layer 2 trailer 35 on both sides of the layer 2 payload 36 to construct the layer 2 frame 33. Next, the layer 1/2 processing section 20 stores the constructed layer 2 frame 33 in the layer 1 payload 32 and attaches the layer 1 header 31 on the front side of the layer 1 header 31 to construct a layer 1 frame 42. Then, the layer 1/2 processing section 20 sends the layer 1 frame 42 onto the transmission path or access line connected to the designated output interface section.

With the above operation, the IP packet transferred from a transmission path or access line to the router apparatus through a corresponding input interface is transferred onto a transmission path or access line corresponding to an output interface.

The following techniques are similar to the above technique. For example, in the above description, a variable-length packet is segmented into fixed-length cells. However, WO/26589 or Japanese Patent Laid-Open No. 7-245628 discloses a technique of multiplexing a short packet on a fixed-length packet (53-byte ATM [Asynchronous Transfer Mode] cell) and transferring it between nodes on a network. Japanese Patent Laid-Open No. 63-197148 discloses a technique of grouping short packets having the same destination into a long packet and transferring it on a network.

Problems of the above-described IP packet transfer using the conventional router apparatus will be described next.

(1) First Problem of Prior Art

As described above, the crossbar switch section 13 shown in FIG. 16 is a switch for processing the fixed-length device cell 40 as shown in FIG. 17. For this reason, when the transfer time unit of the device cell 40 is represented by "τ", the switch connection operation of the crossbar switch section 13 must be switched every transfer time unit τ. Hence, the switch scheduler section 12 must calculate setting for the switch connection in the crossbar switch section 13 every time in the transfer time unit τ. This also applies to the above-described WO/26589 and Japanese Patent Laid-Open No. 7-245628. In these prior-art techniques, short ATM cells of 53 bytes are switched by packet switching.

To increase the switching capacity of the router apparatus, the number of interfaces in the input interface sections 10-1 to 10-N or output interface sections 11-1 to 11-N must be increased without changing the interface speed, or the interface speed must be increased without changing the number of interfaces. In the former case, the number of the input interface sections or output interface sections increases, and accordingly, the amount of calculation for switch connection setting increases. Since the device that implements the router apparatus has a limited ability, the amount of calculation processable within the range of transfer time unit τ (i.e., the calculation ability of the switch scheduler section 12) also has an upper limit. For this reason, the number of interfaces cannot be increased beyond a certain upper limit, and the switching capacity cannot be increased beyond a predetermined capacity, either.

When the latter of the above-described two measures is selected, the interface speed of the input interface section or output interface section is increased, and the transfer time unit τ of the device cell 40 becomes short in inverse proportion to the interface speed. This is equivalent to a decrease in calculation time for switch connection setting. After the interface speed is increased, calculation for switch connection setting can be executed for only a smaller number of interfaces within the defined transfer time unit τ. That is, in this case as well, it is difficult to increase the switching capacity. As described above, since the upper limit of the switching capacity or switching scale is determined by the length of the device cell 40, the switching capacity of the router apparatus cannot be increased beyond a predetermined capacity.

(2) Second Problem of Prior Art

As is mentioned in association with the first problem, when the fixed-length device cell 40 to be switched in the router apparatus is small, and the cell transfer time is short, the transfer time unit τ for defining the limit of the calculation time for switch connection setting in the switch scheduler section 12 becomes short (this also applies to the above-described WO/26589 and Japanese Patent Laid-Open No. 7-245628). The device cell 40 must inevitably have a predetermined length or more. Especially, in a large-scale router apparatus, when a device cell of 64 bytes (minimum length of an IP packet) or less is defined, the calculation time necessary for switch connection setting cannot be ensured. Many existing large-scale routers define a device cell longer than the minimum length of an IP packet, e.g., a 128- or 256-byte long cell. For this reason, the throughput of switching remarkably degrades depending on the distribution of lengths of transferred IP packets.

This will be described below in more detail. Assume that the size of the device cell 40 is 128 bytes, IP packets having the minimum length (i.e., 64 bytes) are continuously input to the input interface sections 10-1 to 10-N, and these IP packets are transferred to different output interface sections of the output interface sections 11-1 to 11-N. The packet segmenting section 16 and packet reassembler section 18 shown in FIG. 16 are provided originally for the purpose of segmenting a variable-length IP packet into the device cells 40 for the use in the router apparatus, causing the crossbar switch section 13 to switch the segmented device cells 40, and reassembling the IP packet from the switched device cells 40 in the output interface sections 11-1 to 11-N.

However, in the assumed situation above, since the IP packet itself is shorter than the device cell and therefore cannot be segmented, the device cell 40 must be transferred using the IP packet itself as its unit. For this reason, the payload region of the device cell 40 is partially unused. This unused region directly corresponds to the unused band of switching, so the throughput of switch operation is decreased by the amount of the unused region. For example, assume that 64-byte long packets PA, PB, and PC are sequentially input to one of the input interface sections of the router apparatus and transmitted to the packet segmenting section 16 in the input interface section, as shown in FIG. 18.

Since these IP packets are to be transferred to different output interface sections, and the size of the device cell 40 is 128 bytes, as shown in FIG. 18, each device cell 40 with an inserted IP packet undesirably keeps its 1/2 region i.e., 64-byte region (corresponding to a "free band" in FIG. 18) unused. In addition, since the speed of inputting an IP packet to the packet segmenting section 16 equals the speed of outputting each device cell 40 from the packet segmenting section 16, device cells corresponding to only 1/2 the input information amount can be output. Since 1/2 of IP packets input to the packet segmenting section 16 is discarded by the packet segmenting section 16, the throughput of switch operation decreases to 50%. The above-described Japanese Patent Laid-Open No. 63-197148 also suffers the same problem as described above because it is suggested that a routing processing means in a packet switching network actually segments a long packet into device cells and switches them.

(3) Third Problem of Prior Art

Generally, IP packets have variable lengths. When the packet segmenting section 16 in the router apparatus segments an IP packet into the fixed-length device cells 40, the device cell containing the end portion of the IP packet has a free region. For example, when the single IP packet 37 is segmented into device cells 40*a* to 40*f*, as shown in FIG. 19, the device cell 40*f* at the end portion has a free portion (corresponding to the "free region" in FIG. 19). Padding is necessary for this free portion. When the series of device cells 40*a* to 40*f* are transferred to the crossbar switch section 13, the free portion contained in the final device cell 40*f* always serves an unused region to decrease the switch transfer capacity.

For example, assume a case wherein the length of the device cell is 128 bytes, and only 129-byte long IP packets are generated. In this case, the switch transfer capacity decreases to 129/(128×2)≈50%. This problem also occurs in the above-described WO/26589 and Japanese Patent Laid-Open No. 7-245628 in which switching is executed in units of ATM cells, and the above-described Japanese Patent Laid-Open No. 63-197148 in which it is suggested that a routing processing means in a packet switching network actually segments a long packet into device cells and switches them.

SUMMARY OF THE INVENTION

It is an object of the present invention to provide a packet transfer method and apparatus and a packet communication system, which can increase the size of switching unit or transfer time unit of a crossbar switch section constructing a packet transfer apparatus, ensure the calculation time necessary for switch connection setting even when the number of input/output interfaces or input/output interface speed increases, and increase the number of packets transferable on a network.

It is another object of the present invention to provide a packet transfer method and apparatus and a packet communication system, which can sufficiently increase the minimum value of a packet to be transferred on a network, and increase the number of packets transferable on the network without any degradation in throughput of switch operation due to a free band.

It is still another object of the present invention to provide a packet transfer method and apparatus and a packet communication system, which can increase the number of packets transferable on the network without wasting a free band even when a packet is segmented into device cell units and switched.

In order to achieve the above objects, according to the present invention, there is provided a packet transfer method comprising the steps of causing a transmission-source access network to generate a packet to be transferred to a destination access network and transmit the packet to a transmission-source packet transfer apparatus connected to the transmission-source access network, causing the transmission-source packet transfer apparatus to convert the packet transmitted from the transmission-source access network into a superpacket having a length n times (n is an integer of not less than 2) larger than a fixed-length cell as a switching unit of relay means arranged on a network serving as a backbone, and send the superpacket to the network, causing the network to relay the superpacket using the relay means and transfer the superpacket to a destination packet transfer apparatus connected to the destination access network, and causing the destination packet transfer apparatus to reassemble the packet generated by the transmission-source access network on the basis of the superpacket transferred from the network and send the packet to the destination access network.

BRIEF DESCRIPTION OF THE DRAWINGS

FIG. 4 is an explanatory view showing the format of the packet header of the superpacket according to the embodiment of the present invention;

FIG. 5A is an explanatory view showing a state wherein an IP packet crosses superpackets in the embodiment of the present invention, in which an IP packet is segmented into a plurality of superpackets;

FIG. 5B is an explanatory view showing a state wherein a superpacket is padded with an IP packet in the embodiment of the present invention, in which the superpacket has a free region;

FIG. 19 is an explanatory view showing a state wherein an IP packet is segmented into device cells, and the device cell at the end portion has a free region.

DESCRIPTION OF THE PREFERRED EMBODIMENT

An embodiment of the present invention will be described below with reference to the accompanying drawings. The present invention can be applied to general packets or frames to be transferred on a network. In this embodiment, a description will be made by exemplifying a router apparatus for processing an IP packet of these packets or frames.

(1) Arrangement of Network

Figure 1:
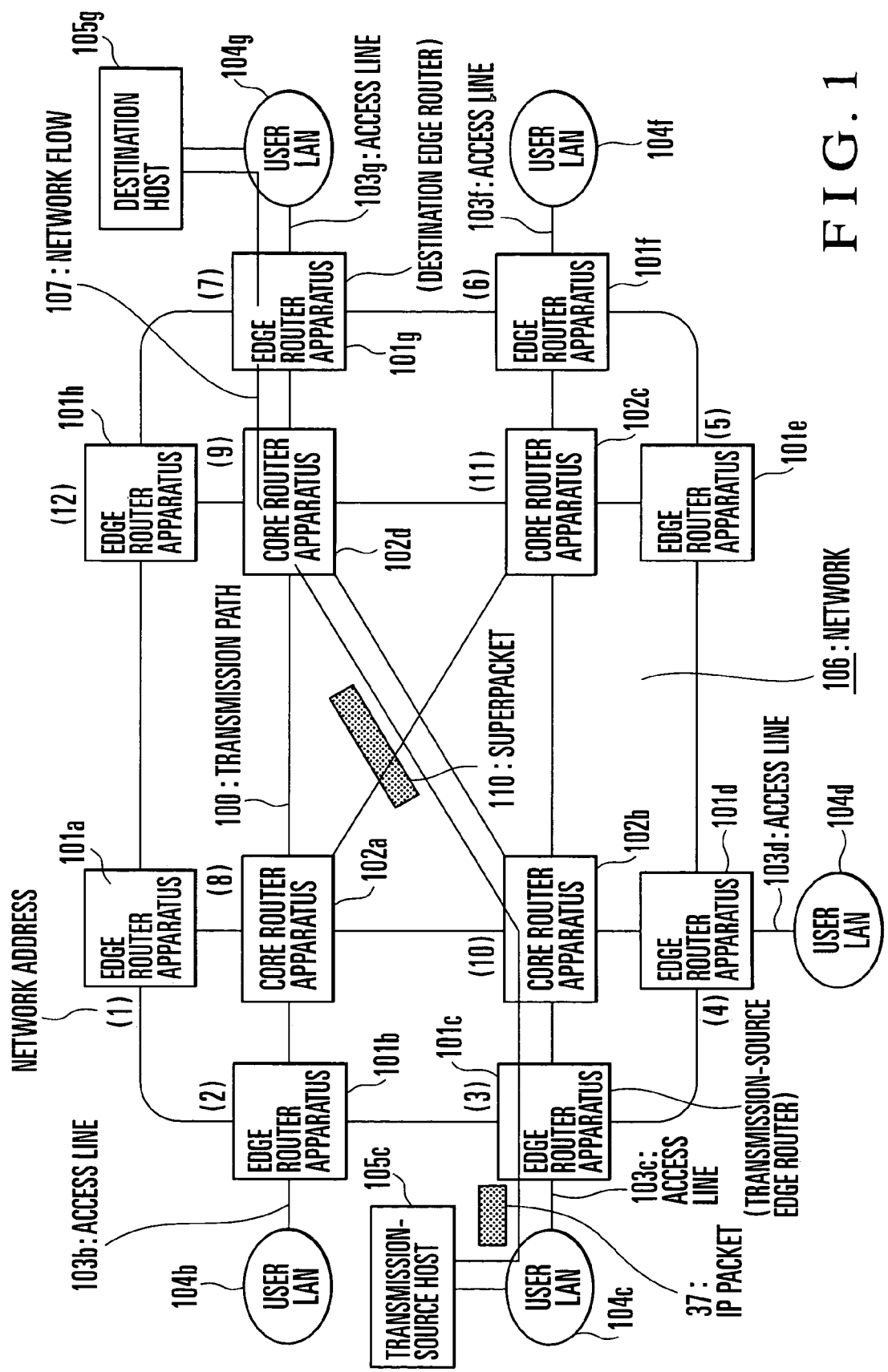
FIG. 1 is a block diagram showing the arrangement of a packet communication system according to an embodiment of the present invention.
Figure 15:
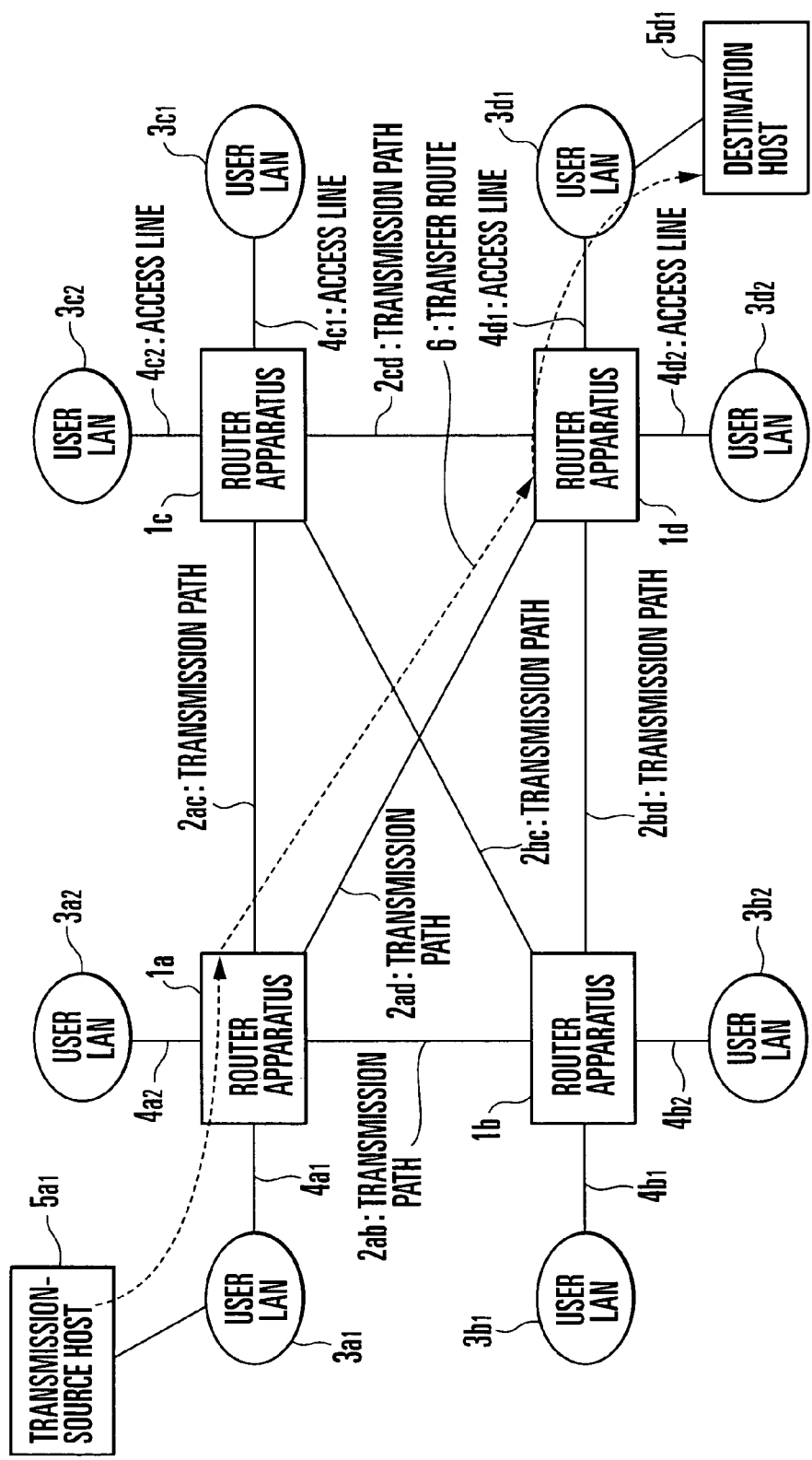
FIG. 15 is a block diagram showing the arrangement of a conventional packet communication system.

FIG. 1 shows the arrangement of a packet communication system to which this embodiment is applied. As shown in FIG. 1, as a characteristic feature, a network for implementing this embodiment has two types of router apparatuses: core router apparatuses and edge router apparatuses. In the network of this embodiment, not only these router apparatuses but also user LANs as in the conventional network described with reference to FIG. 15 are arranged. The core router apparatuses and edge router apparatuses are connected through transmission paths 100. Each edge router apparatus and a corresponding user LAN are connected through an access line. To avoid cumbersomeness, not all transmission paths in FIG. 1 have reference numerals.

This will be described in more detail. FIG. 1 exemplifies eight edge router apparatuses 101a to 101h connected in a loop through the transmission paths 100, four core router apparatuses 102a to 102d connected to each other through the transmission paths 100, and user LANs 104b, 104c, 104d, 104f, and 104g connected to the edge router apparatuses 101b, 101c, 101d, 101f, and 101g through access lines 103b, 103c, 103d, 103f, and 103g, respectively. Each core router apparatus is connected to two adjacent edge router apparatuses through the transmission paths 100. For example, the core router apparatus 102a is connected to the edge router apparatuses 101a and 101b.

A host terminal is also connected to each user LAN, as in FIG. 15. FIG. 1 illustrates only a transmission-source host 105c connected to the user LAN 104c and a destination host 105g connected to the user LAN 104g. The numbers of edge router apparatuses, core router apparatuses, user LANs, and host terminals can be arbitrary. The numbers of edge router apparatuses, core router apparatuses, and user LANs connected to each edge router apparatus, the number of host terminals connected to each user LAN, and the numbers of core router apparatuses and edge router apparatuses connected to each core router apparatus may also be arbitrary.

For example, the line speed of the access line connected to each user LAN is as low as 10 to 100 Mbps for, e.g., the Ethernet. On the other hand, each edge router apparatus or core router apparatus has an ability on the order of Tbps. The speed of each transmission path 100 connecting these apparatuses also reaches, e.g., several to 10 Gbps. Assume that 10 transmission paths of 10 Gbps are connected to one edge router apparatus. This means that 1,000 unit access lines of 100 Mbps can be connected to one edge router apparatus.

Figure 2:
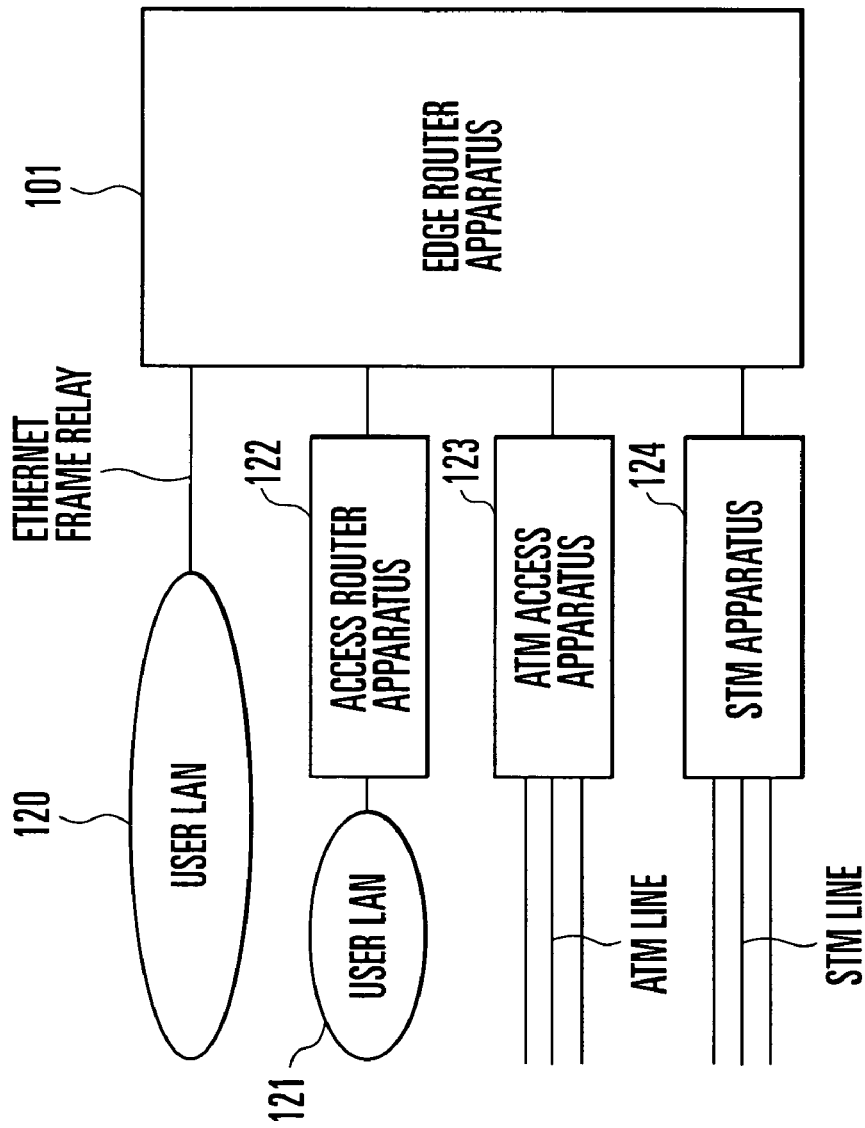
FIG. 2 is a block diagram for exemplifying the connection relationship between an edge router apparatus and an access network in the embodiment of the present invention.

In the form exemplified in FIG. 1, a user LAN is connected to each edge router apparatus. In place of the user LAN, an existing general access network, existing switching system, existing router apparatus, or existing communication network apparatus used for SDH (Synchronous Digital Hierarchy) may be connected. FIG. 2 exemplifies such an access network. Referring to FIG. 2, an edge router apparatus 101 is connected to a user LAN 120 through the Ethernet or frame relay network, the edge router apparatus 101 is also connected to a user LAN 121 through an existing access router apparatus 122, the edge router apparatus 101 is also connected to ATM (Asynchronous Transfer Mode) lines through an existing ATM access apparatus 123, and the edge router apparatus 101 is also connected to STM (Synchronous Transfer Mode) lines through an existing STM apparatus 124.

Referring back to FIG. 1, in this embodiment, a network serving as the backbone of the packet communication system is constituted inside a frame formed by the edge router apparatuses 101a to 101h and transmission paths 100 connecting them. This will be defined as a network 106 hereinafter. That is, in the packet communication system of this embodiment, the network 106 and each user LAN are separated from each other by the edge router apparatuses 101a to 101h. Operation in this network 106 is done using "network addresses" as a unique address system exclusively used in this network.

Parenthesized numbers "1" to "12" indicate unique network addresses assigned to the edge router apparatuses and core router apparatuses. For example, "1" is assigned to the edge router apparatus 101a as a network address. The network address values are uniquely set for the edge router apparatuses and core router apparatuses constructing the network 106, so a packet (superpacket 110 to be described later) can be transferred in the network 106 on the basis of only the network address. In other words, the core router apparatuses in the network 106 never look up destination IP addresses contained in the headers of IP packets sent from the individual user LANs.

In this embodiment, a traffic flow in the network 106 is called a network flow. A network flow 107 exemplified in FIG. 1 is defined as the traffic of a packet transferred from the edge router apparatus 101c at the inlet ("Ingress") of the network 106 to the edge router apparatus 101g at the outlet ("Egress") of the network 106. In the following description, an edge router apparatus corresponding to the edge router apparatus 101c on the network flow 107 may be called a "transmission-source edge router" or "Ingress router", and an edge router apparatus corresponding to the edge router apparatus 101g on the network flow 107 may be called a "destination router" or "Egress router".

Each core router apparatus is installed at a predetermined relay point in the network 106. The core router apparatus executes routing in units of fixed-length superpackets transferred from an adjacent edge router apparatus or another core router apparatus and transfers the packets. For this reason, the core router apparatus of this embodiment need not segment a packet or frame into device cells and transfer the cells, unlike the router apparatus described in the prior art, and can directly transfer packets in the network 106 in units of superpackets.

As will be described later, a superpacket is a network frame defined only in the network 106 and has a header in the same format as in a normal IP packet. The superpacket is handled like a normal IP packet on the IP layer. Hence, the core router apparatus can be constructed by a normally used IP router apparatus. In addition, since a destination address represented by the format of the network address is written in the header of a superpacket to be transferred by the core router apparatus, the following advantages are obtained.

A general IP router apparatus has an address solution table (corresponding to the route search table 17 in FIG. 16) corresponding to all destination IP addresses (addresses each having a numerical value represented by, e.g., 32 bits). To the contrary, the core router apparatus only need construct an address solution table having entries in number corresponding to the relatively small number of network addresses defined in the network 106. For example, the address solution table (route search table) in each core router apparatus shown in FIG. 1 only need have at least 12 entries, so the address solution table can be made smaller than that of the prior art. Additionally, as the superpacket becomes longer, the number of times of switching in the core router apparatus decreases, and correspondingly, the scale of core router apparatus can be increased.

Each edge router apparatus is a router apparatus located at the boundary of the network 106 to perform conversion processing for data transfer between the network 106 and each user LAN. Thus, in this embodiment, although an edge router apparatus must be inevitably arranged between the network 106 and an existing access network such as a user LAN, a core router apparatus may be inserted into, e.g., the transmission path connecting the edge router apparatus 101a and edge router apparatus 101b in FIG. 1.

In this embodiment, transfer on the user LAN side is done in units of IP packets 37 (more exactly, layer 1 frames containing the IP packets 37) described with reference to FIG. 17. However, since transfer in the network 106 is performed in units of superpackets as common frames, as will be described below, transfer on the access network side is not limited to that in units of IP packets. For example, as described above with reference to FIG. 2, a traffic of ATM, speech, or STM data can also be packeted into a superpacket and stored. For the descriptive convenience, an IP packet will be exemplified below.

Figure 17:
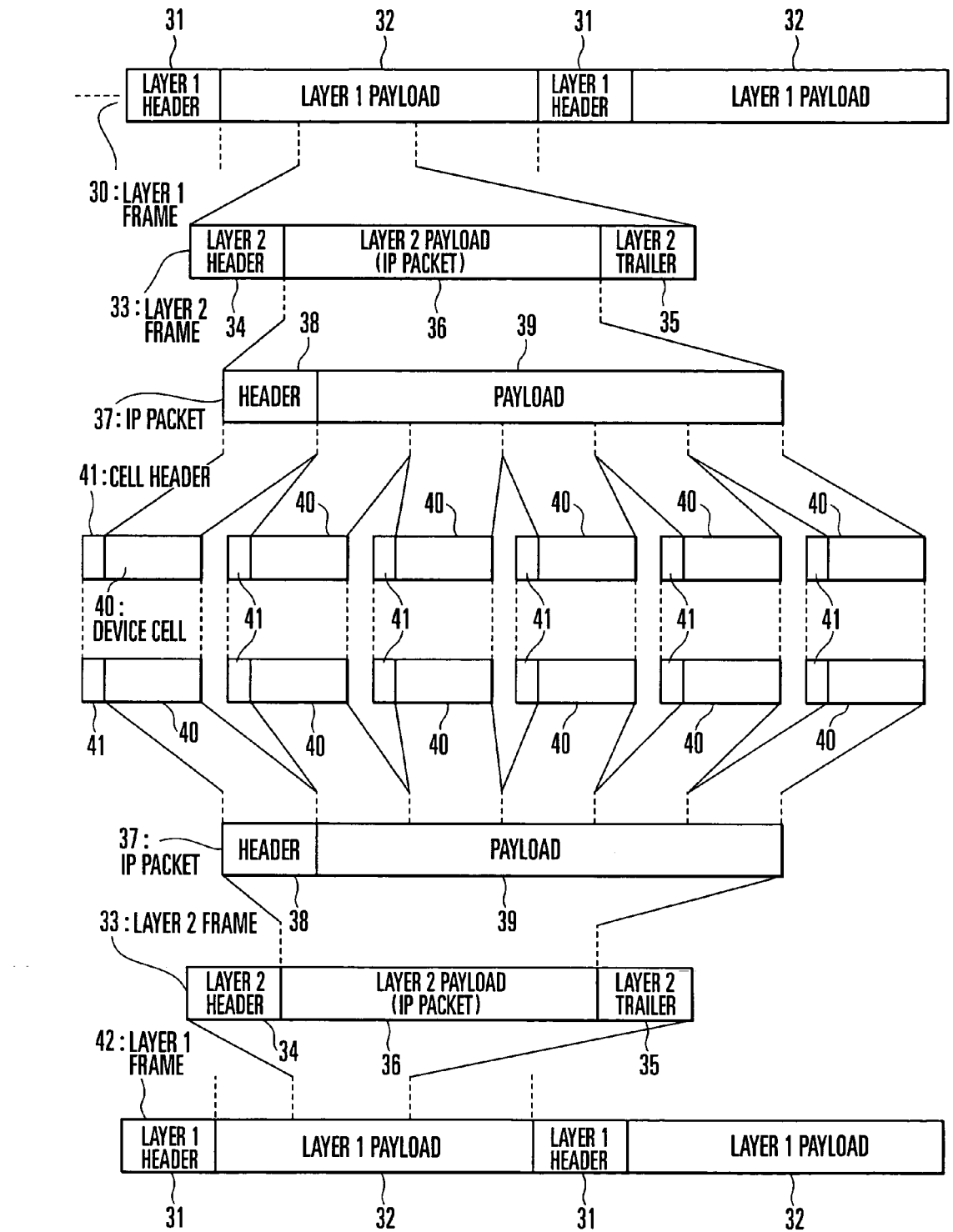
FIG. 17 is an explanatory view showing a process of disassembling/assembling, in the router apparatus, a layer 1 frame to be transmitted on a transmission path or access line in the prior art.
Figure 18:
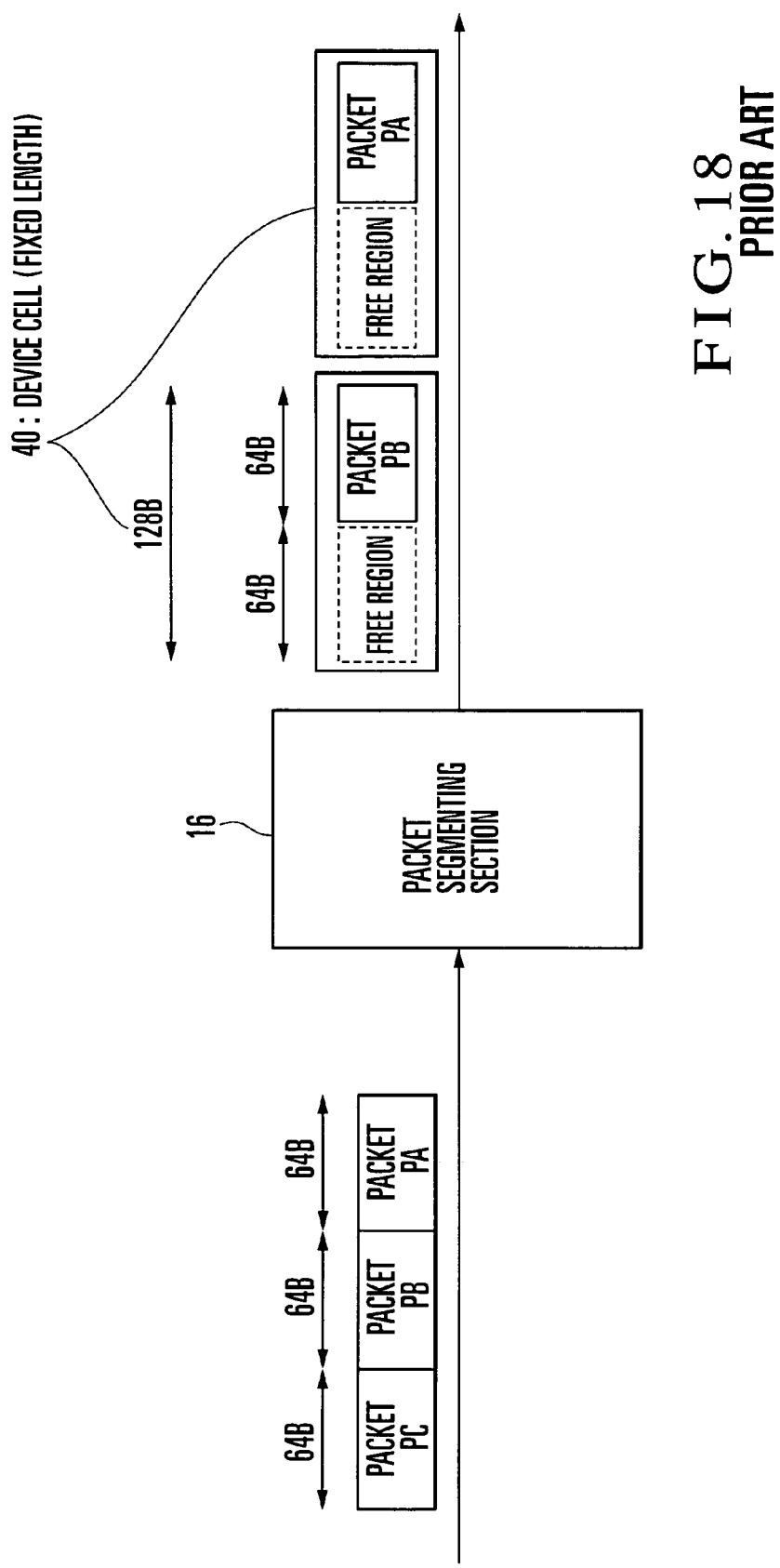
FIG. 18 is an explanatory view showing a state wherein IP packets are segmented into device cells.

On the other hand, in the network 106, transfer is done not in units of IP packets but in units of superpackets 110 whose length is an integer multiple of a fixed length L of a device cell 40 shown in FIG. 17. More specifically, the superpacket 110 has a size corresponding to a fixed length "n×L" (n is an integer of 2 or more). Note that the value n is defined as "2" or more because when the value n is "1", the packet means the device cell itself. This fixed length "n×L" may be called a "superpacket length" in the following description. The superpacket 110 is defined only inside the network 106. In other words, only the superpacket 110 is transferred in the network 106.

The superpacket length is normally 1,500 to 2,000 bytes, which is about 1/10 the average length of individual IP packets. In implementation of this embodiment, the superpacket length has no upper limit, and its size can be appropriately determined in constructing a network.

As described in the prior art, the IP packet 37 or superpacket 110 having the format of layer 1 frame is actually transmitted on the access line or transmission path 100. To avoid cumbersomeness, an expression "an IP packet 37 or superpacket 110 is transferred on the transmission path or access line" may be used.

As will be described below, since the superpacket 110 itself has the same frame format (packet format) as that of the IP packet 37, each core router apparatus can be implemented by a normal IP router apparatus, as described above. On the other hand, as for an edge router apparatus, for example, the transmission-source edge router 101c converts IP packets having various lengths, which arrive from the user LAN 104c, into the frame format of superpacket 110 in units of destination edge routers including the destination edge router 101g. Conversely, the destination edge router 101g executes processing of extracting an original IP packet from each superpacket 110 transferred through the network flow 107 on the network 106. A normal router apparatus does not have such superpacket assembling/disassembling function. This function is unique to the edge router apparatus of this embodiment.

(2) Frame Structure of Superpacket

Figure 3:
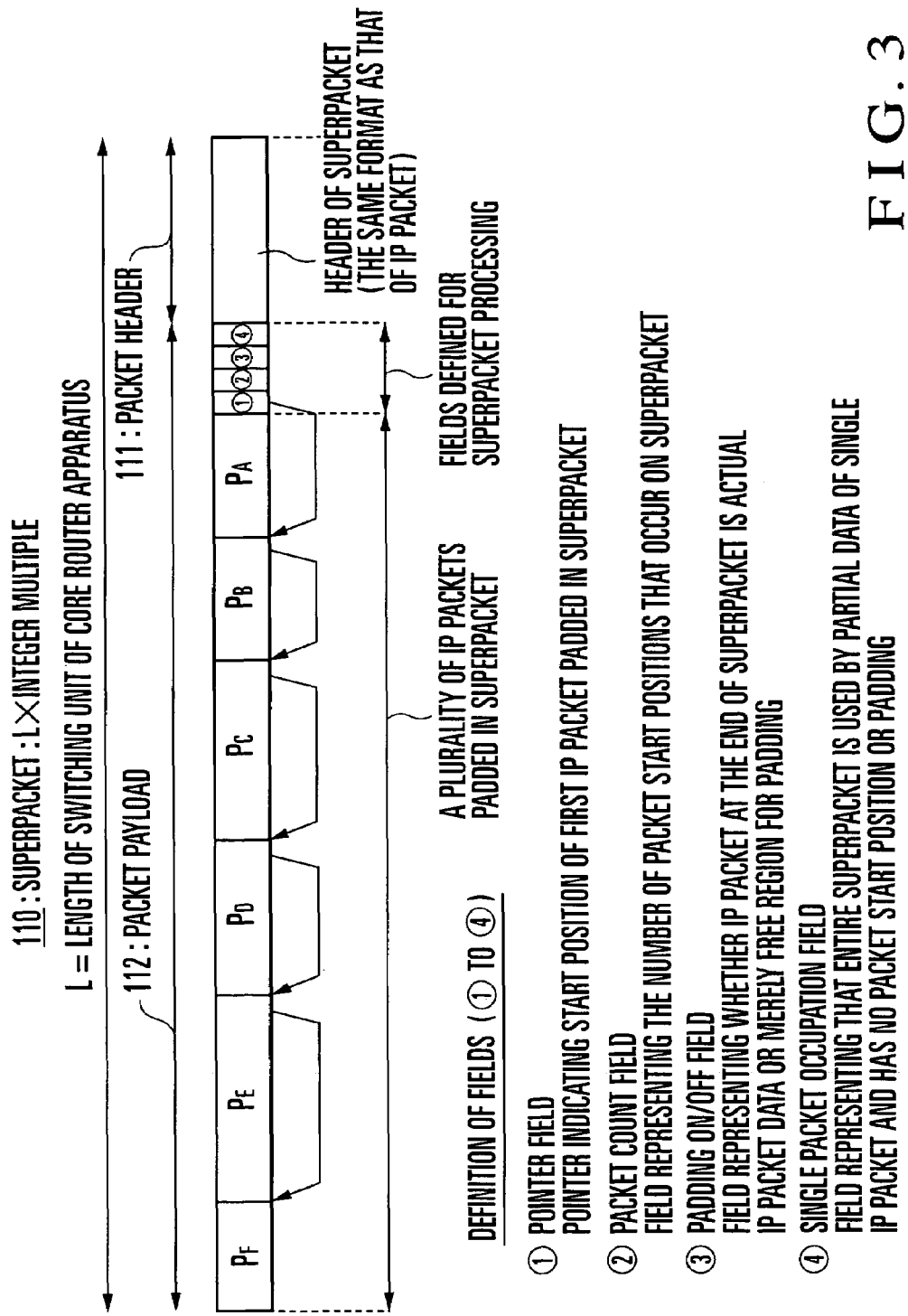
FIG. 3 is an explanatory view showing the frame format of a superpacket according to the embodiment of the present invention.

A detailed format of the superpacket will be described below. As shown in FIG. 3, the frame format of the superpacket 110 is the same as that of the above-described normal IP packet. More specifically, as common points to an IP packet, a packet header 111 is defined first in the superpacket 110, and a packet payload 112 is defined next to the packet header 111. As shown in FIG. 4, the format of the packet header 111 of the superpacket 110 is also the same as the header format of the IP packet.

The superpacket is different from the IP packet in the following point. Although the entire length of IP packet is variable, the superpacket has a fixed length corresponding to an integer multiple of length of a device cell as a switching unit in the conventional router apparatus shown in FIG. 15 or 16. The superpacket 110 corresponds to the network flow 107 as traffic transfer from the transmission-source edge router (Ingress router) 101c in the network 106 to the destination edge router (Egress router) 101g in that network, and the type of superpacket 110 discriminated by the packet header 111 corresponds to the network flow 107 in a one-to-one correspondence. For this reason, the packet header 111 on the route of the network flow 107 always has the same format across the network flow 107.

The header format of the superpacket 110 will be described with reference to FIG. 4. Referring to FIG. 4, the same header format as that of an IPv4 packet is employed. However, even when, e.g., an IPv6 format is used, the superpacket has the same header format as that of a normal IP packet. However, values stored in the fields of the header are slightly different between the two packets. More specifically, in the IP packet, a transmission-source IP address and destination IP address are stored in the transmission-source address and destination address fields of the header portion.

On the other hand, in the packet header 111 of the superpacket 110, network addresses (i.e., transmission-source edge router address and destination edge router address) assigned to edge router apparatuses corresponding to the transmission source and destination in the network 106 are stored in the transmission-source address and destination address fields, respectively. For example, in the network flow 107 shown in FIG. 1, the address value "3" of the transmission-source edge router 101c is described as a transmission-source address in the packet header 111, and the address value "7" of the destination edge router 101g is described as a destination address in the packet header 111.

Fields other than the transmission-source address and destination address fields will also be described below. "Version" represents the version of IP software used to transmit the packet. In this case, data representing "version 4" is stored. "IHL" stands for Internet Header Length and indicates the size of packet header 111 in units of 4 octets. "Service type" indicates the type of IP service for transmission. "Total length" represents the total length of the superpacket 110 comprised of the packet header 111 and packet payload 112 in units of octets. "Identifier (ID)" is a field where number unique to each packet is set as reference information used to transfer data to an upper layer (to be described later). "Flag" represents information associated with packet segmentation, i.e., whether segmentation is enabled/disabled, or for a segmented packet, whether it is the final packet.

"Fragment offset" represents, for a segmented packet, the offset from the start position of the original data in units of octets. "TTL" stands for "Time To Live" which represents the period when the presence of the packet is permitted in the network in units of seconds. "Protocol" represents a protocol used as an upper layer, such as ICMP (Internet Control Message Protocol), TCP (Transmission Control Protocol), or UDP (User Datagram Protocol). "Header Checksum" is used to confirm the validity of the contents of the packet header. "Option" is a field used to transmit information that is not present in a standard packet header. "Padding" is a free region with which the entire option field has a 4-octet unit size.

Referring back to FIG. 3, the packet payload 112 of the superpacket 110 contains one or a plurality of IP packets sent from each user LAN shown in FIG. 1. The entire packet payload 112 may be padded with part of one IP packet, and this case will be described later. For example, the transmission-source edge router 101c shown in FIG. 1 collects variable-length IP packets which arrive from the user LAN 104c in units of network flows including the network flow 107 directed to the destination edge router 101g, pads with these IP packets the packet payload 112 portions of the superpackets 110 classified in units of network flows 107, and transfers the superpackets 110 to the network 106.

In a certain situation, the final IP packet cannot be completely padded into the packet payload 112, i.e., one IP packet may cross a plurality of superpackets. FIG. 5A shows this situation in which superpackets are padded with a series of IP packets PA to PH that are sequentially input. Superpackets A1 and A2 are sequentially transferred in correspondence with the same network flow 107 and therefore have the same packet header 111. The superpacket A1 has the same structure as that shown in FIG. 3.

When the superpacket 110 is padded with variable-length IP packets, a collection of these IP packets also has a variable length. Assume that the packet PF having a size of "L1+L2" is inserted into the superpacket A1. Since the packet PF is larger than the remaining region (length L1) of the packet payload 112, only data with the length L1 from the start of the packet PF can be inserted. The remaining data with the length L2 is inserted to the start portion of the packet payload 112 of the superpacket A2 to be transmitted next, and after this, the new packets PG and PH are sequentially inserted into the superpacket A2. The packet PA is also assumed to cross the previous superpacket (not shown) and superpacket A1 and transferred, like the packet PF.

Thus, the superpacket A1 is padded with the packets PA to PE and part of the packet PF, and the superpacket A2 is padded with the remaining portion of the packet PF and the packets PG and PH. To cope with this case, a pointer field (① in FIG. 3), packet count field (② in FIG. 3), padding ON/OFF field (③ in FIG. 3), and single packet occupation field (④ in FIG. 3) are defined at the start of the packet payload 112 of the packet header 111, as shown in FIG. 3. When these fields are prepared, the packet payload portion of the fixed-length superpacket can be sequentially padded with variable-length IP packets.

The pointer field ① is a pointer indicating the start position of the first packet in the packet payload 112. As described above, the packet PA shown in FIG. 3 is partially left in the previous superpacket, the start position cannot be defined for the packet PA shown in FIG. 3. On the superpacket 110 shown in FIG. 3, the packet PB is the start packet, so the pointer field ① indicates the start position of the packet PB.

If the packet PA is an independent packet that does not cross a plurality of superpackets, the pointer field ① indicates the start position of the packet PA, and a value "0" is stored in the pointer field ①. That is, the pointer field ① has a value with a reference position immediately after the packet header 111. When the pointer field ① is "0", the packet corresponding to the packet PA shown in FIG. 3 does not cross a plurality of superpackets. To the contrary, when this field has a value other than "0", it can be determined that the packet crosses a plurality of superpackets. The pointer value representing the reference position need not always be "0" and may be, e.g., "1".

The start position of the packet PC padded next to the packet PB can be calculated using not a new pointer but the total length described in the header of the packet PB. More specifically, since the header of the IP packet has the same format as that of the packet header 111 of the superpacket 110 shown in FIG. 4, the start position of the packet PC can be obtained by adding the total length of the packet PB to the pointer field ① representing the start position of the packet PB. This also applies to the packets PD and PE following the packet PC. When the total lengths of the packets PD and PE are further added in accordance with the same procedure as that for the packet PC, the start positions of these packets can be specified.

The packet count field ② is provided for the purpose of specifying the start position of the packet finally stored in the packet payload 112 and represents the number of start positions of IP packets in the packet payload 112. To specify the start position of the finally stored packet, the number of times of generation of IP packets inserted into the packet payload 112 is counted in parallel to the above process, i.e., the process of sequentially tracking the IP packets from the position designated by the pointer field ① and specifying the start position of each packet by regarding the total length contained in the header of each packet as a pseudo pointer.

If "generation count<value of packet count field ②", an IP packet still follows the current IP packet of interest. Hence, the start position of the next IP packet is calculated using the total length contained in the header of the current IP packet. To the contrary, if "generation count=value of packet count field ②", it is recognized that the current IP packet of interest is in the region of the IP packet finally padded in the packet payload 112. In the example shown in FIG. 5A, the start position of the packet PA is not present on the superpacket A1. Since five IP packet start positions are present between the packets PA and PB, PB and PC, PC and PD, PD and PE, and PE and PF, respectively, "5" is set as the value of packet count field ②. Hence, the fifth boundary between the packets PE and PF, which is recognized in the above process, corresponds to the start position of the finally stored packet.

The padding ON/OFF field ③ is provided due to the following reason. If only the above-described pointer field ① is used, it cannot be determined whether the region of the packet PF shown in FIG. 5A is a region where actual IP packet data is divisionally stored in the superpackets A1 and A2, or merely a free region for padding, as shown in FIG. 5B. Hence, it is determined on the basis of the contents of padding ON/OFF field ③ whether the region after the packet PE on the packet payload 112 is part of a new packet (packet PF) or a free region for padding.

In the example shown in FIG. 5B, since this region is a free region, data representing "padding ON" is stored in the padding ON/OFF field ③ of the superpacket A1. In the example shown in FIG. 5A, data corresponding to the length L1 from the start of the packet PF as a new packet is stored in the region, and the remaining data corresponding to the length L2 of the packet PF is stored at the start of the superpacket A2 to be transferred over the same network flow 107 (FIG. 1). In this case, data representing "padding OFF" is stored in the padding ON/OFF field ③ of the superpacket A1.

For the next superpacket A2, the remaining data length L2 is written in the pointer field ① whereby the start position of the packet PG next to the packet PF can be pointed out. Thus, in the destination edge router 101g which has sequentially received the superpackets A1 and A2, the packet PF as the original IP packet can be reassembled by connecting the region with the length L2, which is inserted to the start of the superpacket A2, and the region with the length L1 from the start position of the packet PF finally stored in the superpacket A1.

In the process of inserting IP packets into a superpacket, it can easily be determined whether, for example, the packet PF shown in FIG. 5A crosses the superpackets A1 and A2 or completely stored in the superpacket A1. The superpacket has a predetermined fixed length. Every time an IP packet is extracted from the packet payload of the superpacket, the remaining length of the packet payload is calculated. The total length in the header of the finally stored packet PF is looked up. If this length is larger than the remaining length (length corresponding to the free region shown in FIG. 5B) of the packet payload, it is determined that the IP packet crosses the superpackets A1 and A2. If the two lengths coincide, it is determined that the packet PF is completely stored in the superpacket A1.

In the process of extracting the packet PF from the superpacket A1 on the Egress router side as well, it can easily be determined whether the packet crosses the superpackets A1 and A2. The length of the packet-PF extracted from the superpacket A1 is compared with the total length described in the header of the packet. If the two lengths coincide, it is determined that the packet PF does not cross a plurality of superpackets. If the two lengths do not coincide, it is determined that the packet PF cross a plurality of superpackets.

The above-described assignment of IP packet data crossing superpackets cannot be executed for superpackets corresponding to different network flows: it is possible only in the same network flow. Since superpackets transferred on the same network flow have the same packet header, processing of connecting IP packets between superpackets is applied to superpackets with identical packet headers.

It can be determined without preparing the padding ON/OFF field ③ whether an IP packet crosses a plurality of superpackets or the region is "padding". In the example shown in FIG. 5A, an IP packet crosses a plurality of superpackets. The value of packet count field ② of the superpacket A1 is "5", and the final packet designated by this field is the packet PF. The example shown in FIG. 5B is for padding. The value of packet count field ② of the superpacket A1 is "4", and the final packet designated by this field is the packet PE. The position immediately after the end position of the final packet is calculated on the basis of the total length described in the header of the final packet. In the case shown in FIG. 5A, the position is out of the range of the superpacket A1. In the case shown in FIG. 5B, the position corresponds to the start position of the free region. In the former case, it can be determined that the IP packet crosses a plurality of superpackets. In the latter case, it can be determined that the superpacket has padding.

Figure 6:
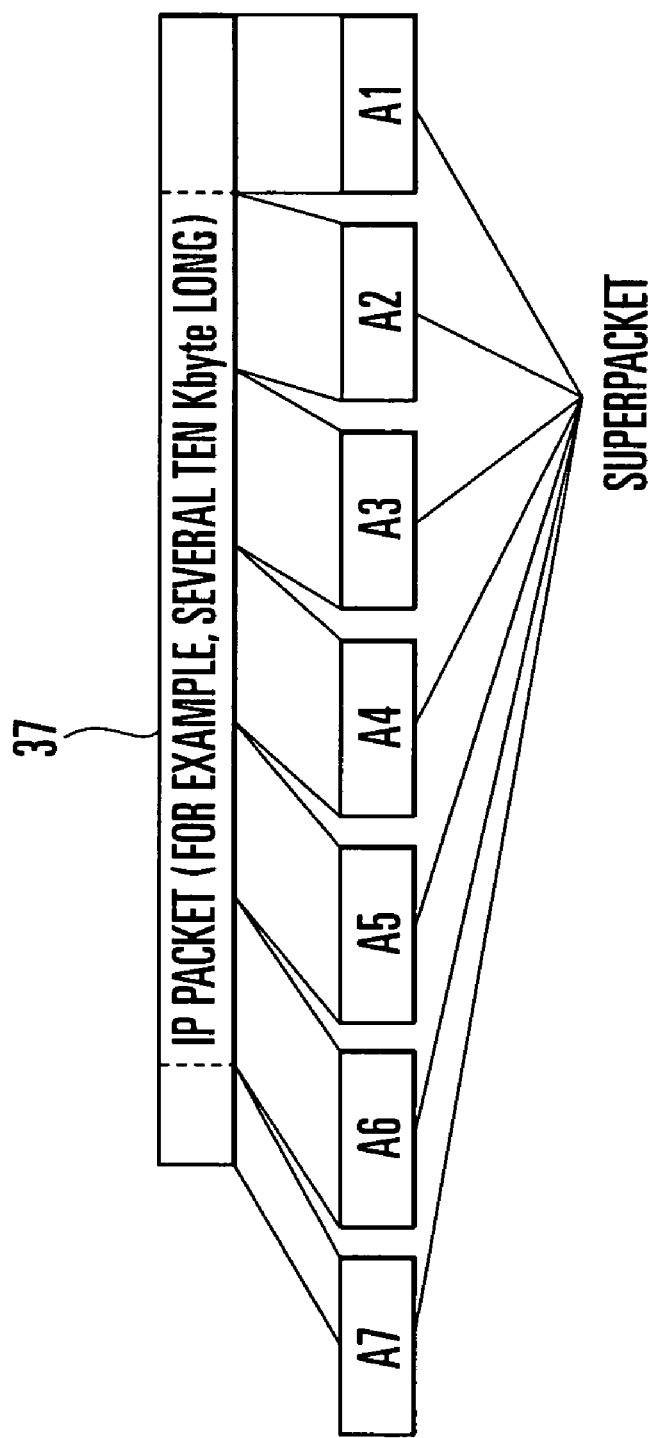
FIG. 6 is an explanatory view showing a state wherein a single IP packet is transferred across a plurality of superpackets in the embodiment of the present invention.

The single packet occupation field ④ is provided due to the following reason. As in the example shown in FIG. 5A, when each IP packet is shorter than the superpacket, and a plurality of IP packets are padded in the packet payload 112 of the single superpacket 110, the above-described fields ① to ③ suffice. However, a case can also be assumed in which the single IP packet 37 is as large as several ten Kbytes and is divisionally transferred using a plurality of superpackets A1 to A7, as shown in FIG. 6. In this case, the entire packet payload 112 of a certain superpacket is occupied by only data of one IP packet. This superpacket has neither an IP packet start position nor a free region (padding).

Referring to FIG. 6, all of the superpackets A1 to A6 are occupied by the data of the same IP packet 37. In these superpackets, the pointer field ①, packet count field ②, and padding ON/OFF field ③ are meaningless. In such a case, the single packet occupation field ④ is used, and when it is "ON", it is determined that the packet payload 112 is occupied by data of one IP packet. When this field is "OFF", it is determined that a plurality of IP packets are padded in the packet payload 112.

For this purpose, the remaining length of the IP packet which has not been padded in the superpacket yet is compared with the length of the packet payload 112 of the superpacket 110. If the former length is equal to or larger than the latter length, the single packet occupation field ④ is set to "ON"; otherwise, this field is set to "OFF". To transfer the superpackets A1 to A6 shown in FIG. 6, the value of single packet occupation field ④ is set to "ON". To transfer the superpacket A7 shown in FIG. 6 or the series of IP packets shown in FIG. 5A or 5B, the value of single packet occupation field ④ is set to "OFF".

The same IP packet is transferred to one edge router apparatus having the same destination edge router address. When an IP packet is divisionally transferred using a plurality of superpackets, the plurality of superpackets are assigned the same packet header 111 corresponding to the same network flow 107, and transferred on the same route (e.g., transmission-source edge router $101c$→core router apparatus $102b$→core router apparatus $102d$→destination edge router $101g$) in the network 106. The destination edge router $101g$ manages superpackets having the same transmission-source edge router address in the same queue whereby an IP packet crossing the plurality of superpackets can be reassembled into the original IP packet.

Finally, differences between the normal IP packet and the superpacket as the characteristic feature of this embodiment will be listed below.

a) The packet length is fixed.
b) A plurality of IP packets can be inserted into the packet payload 112.
c) The pointer field ① is defined on the packet payload 112 in considering a case wherein one IP packet is divisionally inserted into a plurality of superpackets.
d) The number of IP packet start positions on the packet payload 112 is defined in the packet count field ② on the packet payload 112.
e) The padding ON/OFF field ③ representing whether the region of the final packet contained in the packet payload 112 is a free region for padding is defined on the packet payload 112.
f) Considering a case wherein an IP packet is longer than the superpacket, the single packet occupation field ④ representing whether the packet payload 112 is occupied by partial data of a single IP packet is defined on the packet payload 112.

(3) Arrangement of Edge Router Apparatus

The arrangement of each edge router apparatus shown in FIG. 1 will be described next with reference to FIG. 7. An edge router apparatus 201 shown in FIG. 7 corresponds to each edge router apparatus shown in FIG. 1 and roughly comprises access interface ("INF" in FIG. 7) sections 202-1 to 202-M (M: natural number), switch section 203, and superpacket processing sections 204-1 to 204-P (P: natural number). The values "M" and "P" are arbitrary and can be appropriately determined in accordance with the network arrangement or scale of a router apparatus. The edge router apparatus 201 of this embodiment has the same function as that of the router apparatus described in the prior art except that it has the superpacket processing sections 204-1 to 204-P as interfaces on the network 106 side.

Figure 16:
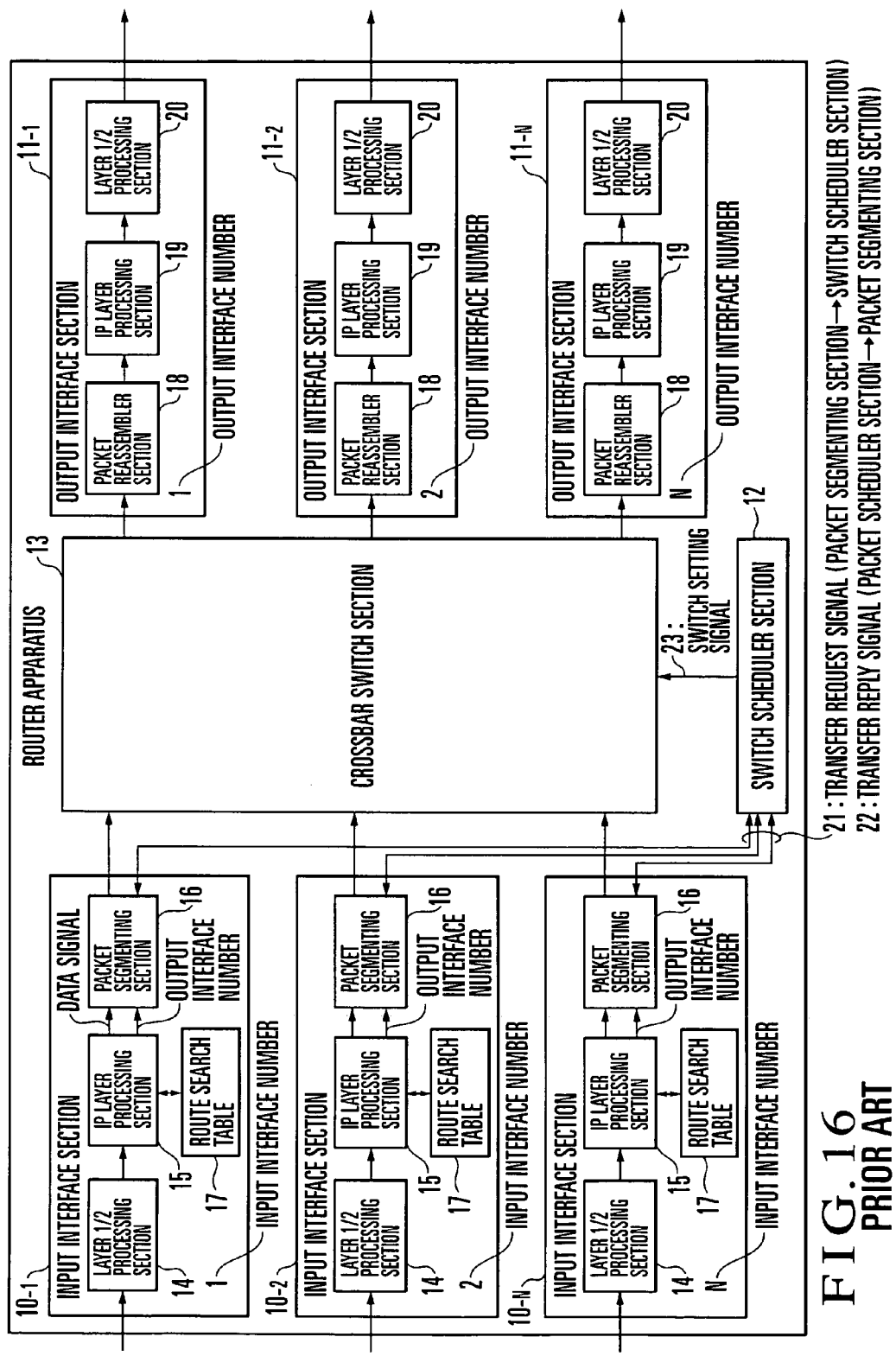
FIG. 16 is a block diagram showing the arrangement of each router apparatus shown in FIG. 15.

More specifically, the switch section 203 is equivalent to the combination of functions of the switch scheduler section 12 and crossbar switch section 13 shown in FIG. 16 and performs switching operation in units of device cells having the fixed length L, as in the router apparatus described in the prior art. The access interface sections 202-1 to 202-M have both the function of the input interface section and that of the output interface section shown in FIG. 16. Each access interface section is connected to a user LAN through the access line shown in FIG. 1.

Like the input interface section shown in FIG. 16, each access interface section extracts the IP packet 37 from a layer 1 frame sent from the user LAN onto the access line and determines the network line to which the IP packet is to be sent, on the basis of a destination IP address described in the header portion of the IP packet 37. Each access interface section segments the extracted IP packet 37 into the fixed-length device cells 40 and sends them to the switch section 203. The access interface section also notifies the switch section 203 of any one of the superpacket processing sections 204-1 to 204-P to which the device cell 40 is to be transferred in correspondence with the output interface number written in the cell header 41 of the device cell 40. Thus, the access interface section transfers the IP packet to one of the superpacket processing sections 204-1 to 204-P, which terminates the determined network line, through the switch section 203.

Conversely, each access interface section receives, from the switch section 203, an IP packet which segmented into device cells and sent from one of the superpacket processing sections 204-1 to 204-P. Like the output interface section shown in FIG. 16, the access interface section reassembles the device cells into the IP packet, executes IP layer processing for the IP packet, and attaches the header of layer 1/2, thereby constructing a layer 1 frame. This layer 1 frame is sent to the user LAN side via the access line.

(a) Arrangement of Superpacket Processing Section

Each of the superpacket processing sections 204-1 to 204-P as a characteristic feature of this embodiment comprises a superpacket forming section 205 for transferring a packet from the user LAN side to the network 106 side shown in FIG. 1, and a superpacket reassembler section 206 for transferring a packet from the network 106 side to the user LAN side. For this purpose, the superpacket forming section 205 has a function of converting an IP packet extracted from device cells into a superpacket and forming a layer 1 frame containing the superpacket. The superpacket reassembler section 206 has a function of converting a superpacket extracted from a layer 1 frame into an IP packet to reassemble the original IP packet and sending it in the form of device cells.

(b) Arrangement of Superpacket Forming Section

Details of the superpacket forming section 205 will be described next with reference to FIG. 8. As shown in FIG. 8, the superpacket forming section 205 comprises a packet reassembler section 18 (FIG. 16) that is the same as described in the prior art, destination edge router determination section 301, write control section 302, read control section 303, buffer section 304, timer section 305, pointer section 306, layer 1/layer 2 ("L1/L2" in FIG. 8) processing section 307, and address solution table 308. The packet reassembler section 18 is connected to the switch section 203 shown in FIG. 7. The layer 1/layer 2 processing section 307 is connected to the transmission path 100 shown in FIG. 1.

Figure 7:
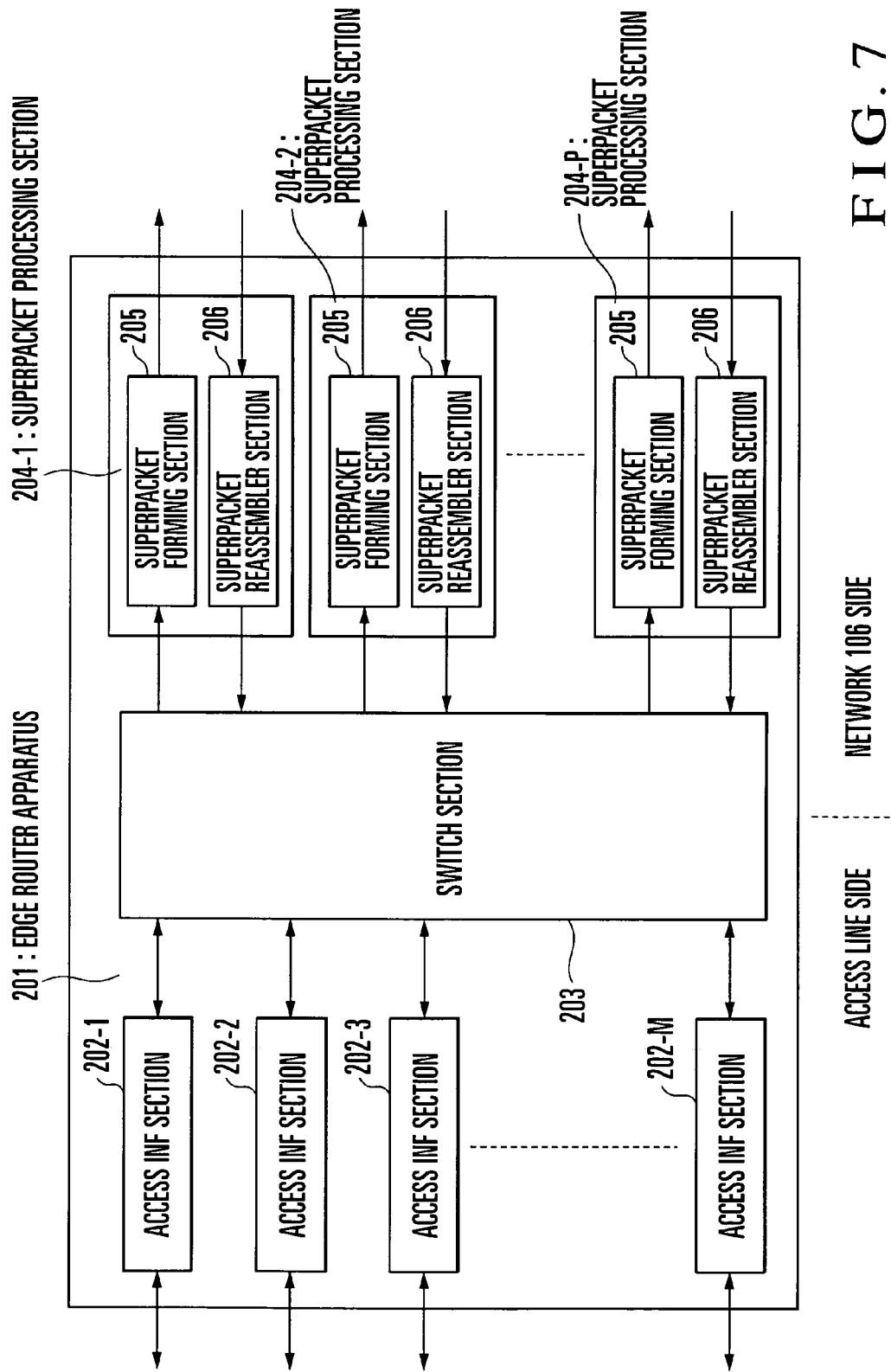
FIG. 7 is a block diagram showing the arrangement of an edge router apparatus according to the embodiment of the present invention.
Figure 8:
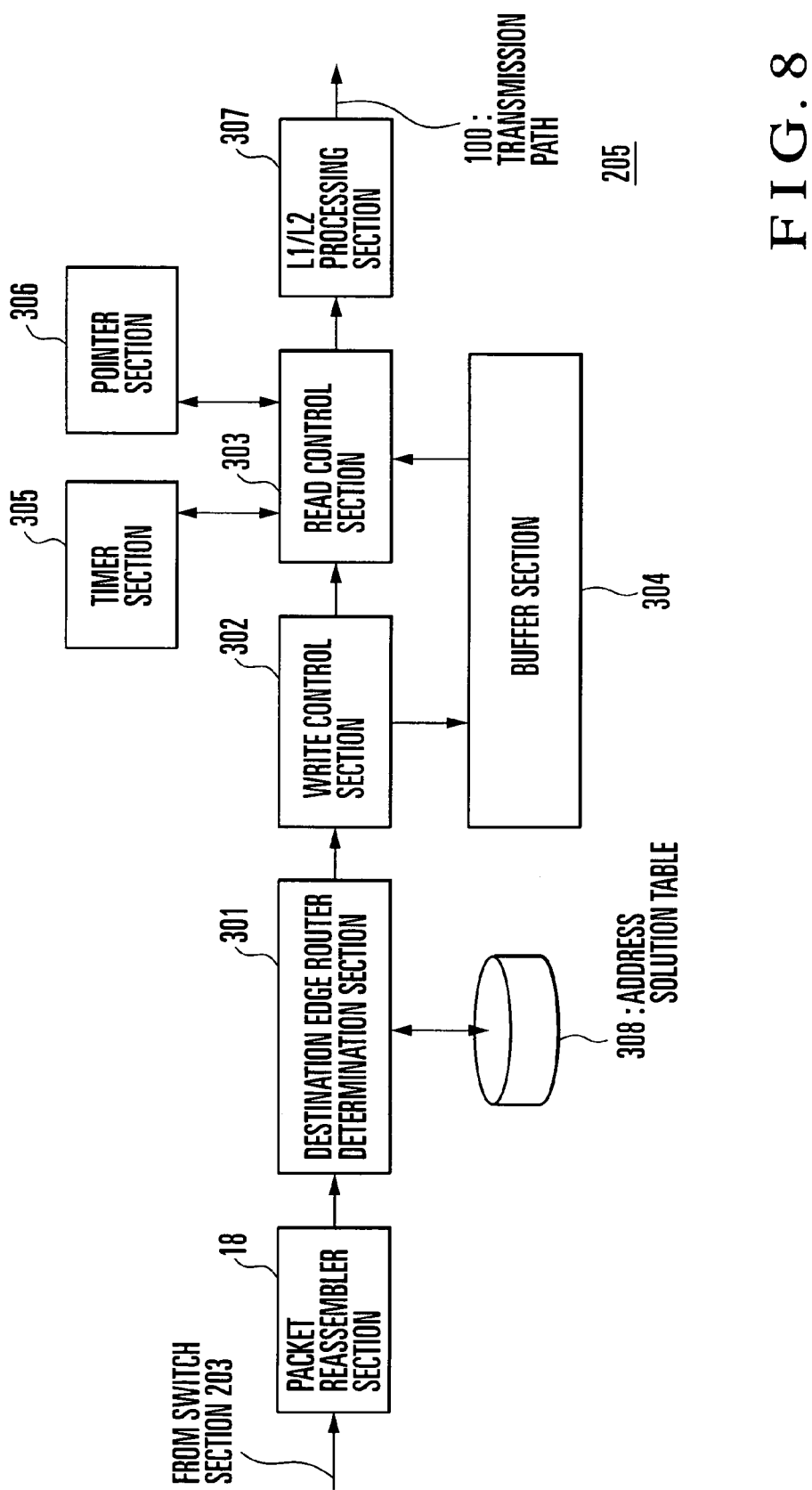
FIG. 8 is a block diagram showing the arrangement of a superpacket forming section 205 in the edge router apparatus shown in FIG. 7.

The packet reassembler section 18 stacks fixed-length device cells sent through the access interface section and switch section 203 shown in FIG. 7 to reassemble the original IP packet sent onto the access line, and transfers the IP packet to the destination edge router determination section 301. Upon receiving individual IP packets from the packet reassembler section 18, the destination edge router determination section 301 searches the address solution table 308 on the basis of a destination IP address contained in the header of each IP packet to solve the destination edge router address, and transfers the destination edge router address to the write control section 302 together with the IP packet.

Figure 9:
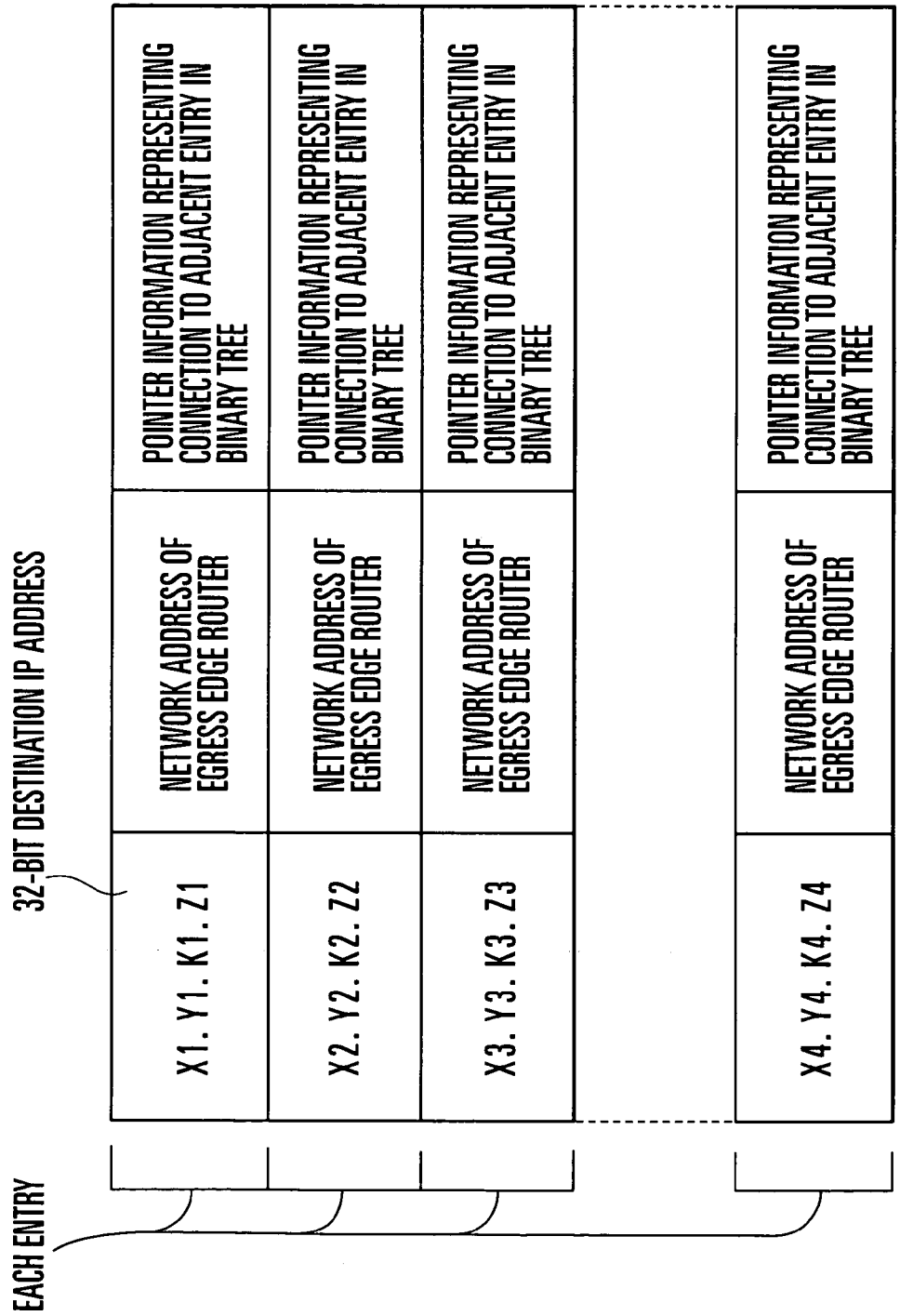
FIG. 9 is an explanatory view showing a table format example of an address solution table 308 shown in FIG. 8.

Address solution processing executed by the destination edge router determination section 301 and the table format of the address solution table 308 will be described. FIG. 9 shows the format of the address solution table 308 which is formed from a binary-tree-like database called a Patricia tree. The binary tree structure is a general technique and a function incorporated in a normal IP router apparatus, and a detailed description thereof will be omitted herein. An example of a reference about the binary tree related to an IP address is "Radix: Keith Sklower, "A Tree-Based Packet Routine Table for Berkeley Unix", USENIX Winter, pp. 93–99, 1991".

Each entry of the address solution table 308 has a destination IP address (32 bits because the packet is an IPv4 packet), a network address assigned to the Egress router corresponding to the destination IP address, and pointer information representing connection to an entry corresponding to an adjacent node or leaf on the binary tree. The entries of this address solution table 308 are constituted in correspondence with all destination IP addresses. The destination edge router determination section 301 searches the address solution table 308 on the basis of a destination IP address written in the header of an IP packet transferred from the user LAN, obtains the network address assigned to the Egress router to which the IP packet is to be finally transferred, and sends the network address to the write control section 302 as a destination edge router address.

Figure 10:
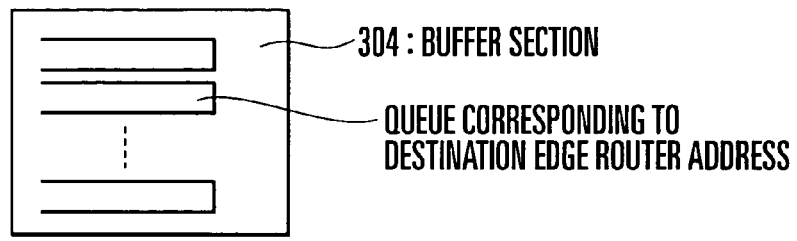
FIG. 10 is an explanatory view showing queues in units of destination edge router addresses managed on a buffer section 304 shown in FIG. 8.

As shown in FIG. 10, the write control section 302 manages, using the buffer section 304, queues in units of network addresses assigned to the destination edge routers in the network 106. The IP packet transferred from the destination edge router determination section 301 is stored in a queue corresponding to the destination edge router address of which the destination edge router determination section 301 has notified. The write control section 302 also notifies the read control section 303 of various kinds of information (for example, the total length contained in the header of the packet) related to the IP packet written in the buffer section 304.

The read control section 303 manages the data length (queue length) stored in each queue in the buffer section 304 on the basis of various kinds of information of which the write control section 302 has notified. The read control section 303 detects that the total data length of IP packets stored in each queue has reached the superpacket length and reads out the stored IP packets from a queue that satisfies the condition. More exactly, the superpacket 110 contains the packet header 111, and the packet payload 112 has the fields ① to ④, as shown in FIG. 3. Actually, when data with a length corresponding to a value obtained by subtracting the superpacket length "n×L" from the length necessary for the header and fields is stored, IP packets are read out from the queue. The read control section 303 attaches the packet header 111 to one or a plurality of readout IP packets and writes data according to the situation of the IP packets in the fields ① to ④ shown in FIG. 3 to form the superpacket 110, and transfers it to the layer 1/layer 2 processing section 307.

The buffer section 304 is a memory for storing IP packets transferred from the destination edge router determination section 301 and has a plurality of different queues in units of network addresses of destination edge routers, of which the destination edge router determination section 301 has notified.

The timer section 305 is provided due to the following reason. When a queue for which a predetermined time T has elapsed after sending the previous superpacket is detected in the buffer section 304, the read control section 303 reads out all IP packets stored on that queue to form a superpacket even when the total length of the stored IP packets is smaller than the superpacket length, and transfers the packet transfer method to the network 106 side through the layer 1/layer 2 processing section 307. In this case, the read control section 303 attaches a free region as a shortage in superpacket length to the formed superpacket 110 for padding.

The above-described predetermined time T is determined in the following way. In the actual network operation, a minimum band is generally set for individual network flows for transfer. For this purpose, the edge router apparatus is designed to set in advance the minimum band to, e.g., 64 Kbps, 1.5 Mbps, or 10 Mbps to transfer a frame with a certain fixed length. For example, assume that 10 Mbps is set as the minimum band for a given network flow, the length of the packet payload of the superpacket is, e.g., 1,800 bytes, and the physical speed of individual transmission paths is OC 48 [transmission path speed standard of ITU (International Telecommunications Union, which corresponds to 2.48832 Gbps].

To satisfy the logical speed of 10 Mbps under these conditions, one superpacket must be transferred every predetermined time T (sec)=1,800 bytes÷10 Mbps=1,800×8 bit÷10 M=14.4 msec. In this case, the upper limit value of stay time of the network flow is 14.4 sec. If the time has exceeded this upper limit value, a superpacket is transferred even when the packet payload has a free region. This makes it possible to guarantee the band of 10 Mbps for the user regardless of traffic congestion.

When not the above-described minimum band but a maximum delay time is defined, the predetermined time T may be determined in units of traffics (network flows) on the basis of the maximum delay time. Assume that a traffic (network flow) which desires that network transfer is always completed within 100 msec is present. The network delay of the traffic is defined by (queue stay time upper limit value of superpacket forming section 205 (on the transmission-source edge router side))+(transmission path delay)+(queue stay time upper limit value of superpacket reassembler section 206 (on the destination edge router side)). On the basis of this maximum allowable value (in this case, 100 msec) of such network delay, the upper limit value of the queue stay time of the superpacket forming section 205 is determined in consideration of the transmission path delay and the queue stay time upper limit value of the superpacket reassembler section 206, and the above-described predetermined time T is determined from the resultant value.

With this arrangement, even when there is little traffic, a superpacket is transferred from the transmission-source edge router to the destination edge router after the elapse of predetermined time T corresponding to the time-out time, so the minimum band can be guaranteed in units of network flows 107. Hence, the timer section 305 incorporates an independent timer for each queue on the buffer section 304. Upon sending a superpacket, the read control section 303 notifies the timer section 305 of it together with the destination edge router address.

At this notification time, the timer section 305 causes the timer corresponding to a queue for the notified destination edge router address to start time counting and notifies the read control section 303 of the destination edge router address corresponding to a queue that has timed out after the elapse of predetermined time T. In the above-described processing, if the network flow has no traffic, and no IP packets are stored in the queue, the read control section 303 neither forms a superpacket nor sends it to the network 106 side. In other cases, when an instruction is received from the read control section 303, the timer section 305 can reset the internal timer and cause it to start time counting from zero.

The pointer section 306 serves as a storage means for holding the length (length L2 shown in FIG. 5A) of the remaining portion of an IP packet crossing a plurality of superpackets, as shown in FIG. 5A. This section is called a pointer section because the value of the length L2 is stored in the pointer field ① (FIG. 3) of the superpacket A2 in FIG. 5A, as described above.

The layer 1/layer 2 processing section 307 attaches a layer 2 header 34 (FIG. 17) and layer 2 trailer 35 to each IP packet transferred from the read control section 303 to convert the IP packet into a layer 2 frame 33, then attaches a layer 1 header 31 to the layer 2 frame 33 to form a layer 1 frame 42, and outputs it onto the transmission path 100 on the network 106 side.

(c) Arrangement of Superpacket Reassembler Section

Figure 11:
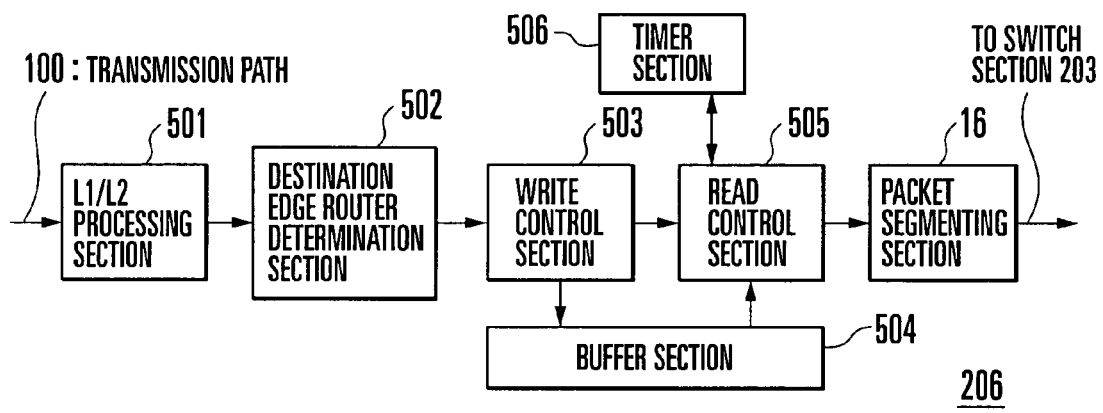
FIG. 11 is a block diagram showing the arrangement of a superpacket reassembler section 206 in the edge router apparatus shown in FIG. 7.

Details of the superpacket reassembler section 206 will be described next with reference to FIG. 11. As shown in FIG. 11, the superpacket reassembler section 206 comprises a layer 1/layer 2 processing section 501, destination edge router determination section 502, write control section 503, buffer section 504, read control section 505, timer section 506, and packet segmenting section 16 (FIG. 16) which is the same as that described in the prior art. The layer 1/layer 2 processing section 501 is connected to the transmission path 100 shown in FIG. 1, and the packet segmenting section 16 is connected to the switch section 203 shown in FIG. 7.

The layer 1/layer 2 processing section 501 receives a layer 1 frame containing the superpacket 110 from the network 106 side (i.e., transmission path 100) and terminates the layer 1/layer 2. More specifically, the layer 1/layer 2 processing section 501 extracts the layer 2 frame 33 from a layer 1 payload 32 of a layer 1 frame 30 (FIG. 17), then extracts the superpacket 110 on a layer 2 payload 36 portion of the layer 2 frame 33, and sends the superpacket 110 to the destination edge router determination section 502.

The destination edge router determination section 502 internally holds a network address (self edge router address) assigned to the edge router apparatus to which the destination edge router determination section 502 itself belongs. The destination edge router determination section 502 is monitoring the contents (i.e., destination edge router address) of the destination address field described in the packet header 111 of the superpacket 110 transferred from the layer 1/layer 2 processing section 501. The destination edge router determination section 502 discards a superpacket whose destination edge router address does not coincide with the self edge router address, and if two addresses coincide, transfers the received superpacket to the write control section 503.

Figure 12:
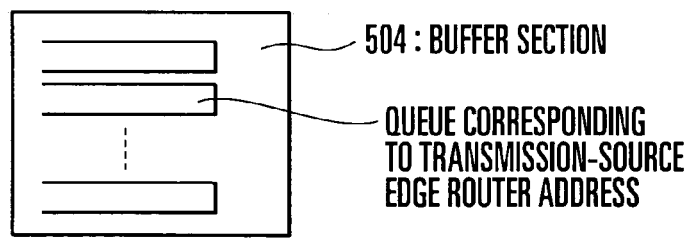
FIG. 12 is an explanatory view showing queues in units of transmission-source edge router addresses managed on a buffer section 504 shown in FIG. 11.

As shown in FIG. 12, the write control section 503 manages, using the buffer section 504, queues in units of network addresses assigned to the transmission-source edge routers in the network 106. The superpacket 110 transferred from the destination edge router determination section 502 is stored in a queue corresponding to the transmission-source edge router address described in the transmission-source address field in the packet header 111 of the superpacket 110.

The buffer section 504 is a memory for storing the superpacket 110 transferred from the destination edge router determination section 502 through the write control section 503, as described above, and has a plurality of different queues in units of transmission-source edge router addresses each contained in the packet header 111 of the superpacket 110.

The read control section 505 sequentially extracts IP packets from the packet payload 112 of each superpacket 110 stored in each queue on the above-described buffer section 504 and sends them to the packet segmenting section 16. When an IP packet crosses a plurality of superpackets, as shown in FIG. 5A, the read control section 505 reassembles the IP packet after all data constructing the IP packet are stored in the queue, and then transfers the IP packet to the packet segmenting section 16.

In the example shown in FIG. 5A, the packet PF is sent after both the region with the length L1 at the end portion of the superpacket A1 and the region with the length L2 at the start of the superpacket A2 are stored. The read control section 505 performs the above-described processing after the start position of the finally stored IP packet is specified on the basis of the pointer field ① and packet count field ② in the packet payload 112 of the superpacket A1, and then it is determined by checking the padding ON/OFF field ③ that the contents of this field are "padding OFF", and the IP packet is not completely stored in the superpacket A1.

As shown in FIG. 6, when the single IP packet 37 crosses a plurality of superpackets, the single packet occupation field ④ of the packet payload 112 is "ON". When such a superpacket is detected, and superpackets whose single packet occupation fields ④ are "ON" continuously are arriving, the read control section 505 sequentially stores the superpackets in a queue on the buffer section 504.

When a superpacket whose single packet occupation field ④ is "OFF" has arrived, the read control section 505 time-serially links data padded in the packet payloads 112 of the superpackets stored on the queue, including the final superpacket, thereby reassembling the original IP packet. As described above, when the single packet occupation field ④ is "ON", the fields ① to ③ are meaningless. For this reason, the read control section 505 checks the single packet occupation field ④ first. If this field is "ON", the above-described processing associated with the single packet is executed regardless of the remaining fields.

The timer section 506 is prepared due to the following reason. In the IP packet reassembler processing by the read control section 505, if some superpackets are discarded in the network 106, the IP packet cannot be reassembled forever. In this case, a normally transferred IP packet stays in the buffer section 504.

For example, when the superpacket A2 shown in FIG. 2A is discarded in the network 106, the data stored in the region with the length L2, i.e., part of the packet PF on the superpacket A1 stays in the buffer section 504 in the destination edge router 101g shown in FIG. 1. The read control section 505 monitors this state. If data queued for IP packet reassembling, which stays in the buffer section 504 for a predetermined time or more, is present, the read control section 505 actively extracts the data from the queue on the buffer section 504 and discards it. This prevents packet data from staying forever in the queue on the buffer section 504.

The timer section 506 is used to count this predetermined time and incorporates an independent timer corresponding to each queue on the buffer section 504. Every time the read control section 505 reassembles an IP packet from a queue on the buffer section 504, and the timer section 506 is notified of it together with the transmission-source edge router address corresponding to this queue, the timer section 506 causes the timer for the queue corresponding to the notified transmission-source edge router address to start time counting from zero at the notification time. After the elapse of predetermined time, the timer section 506 notifies the read control section 505 of the transmission-source edge router address of the queue corresponding to the timer that has timed out. In other cases as well, when an instruction is received from the read control section 505, the timer section 506 causes the internal timer to start time counting from zero again.

The predetermined time to be counted by the timer section 506 is determined on the basis of the predetermined time T set in the timer section 305 of the superpacket forming section 205. The reason for this is as follows. If the minimum band is determined, as described above, at least one superpacket is expected to arrive within the time determined by the minimum band as far as a traffic is present on the transmission-source edge router side. Hence, even when an IP packet divisionally inserted into a plurality of superpackets is being stored in a queue, the latter half portion must arrive within the time determined by the minimum band. However, this time slightly changes if congestion or jitter occurs in the network. More strictly, it is preferable to take such variation time into consideration.

Eventually, the interval of superpackets arriving at a queue formed on the buffer section 504 is (upper time defined in the superpacket forming section 205)+(delay distribution time [e.g., CDV (Cell Delay Variation allowable value)] in network). In this embodiment, the upper value of the predetermined time to be counted by the timer section 506 is obtained by adding a predetermined protection time α to the superpacket arrival interval. That is, the predetermined time can be estimated as "(upper limit time defined in superpacket forming section 205)+(delay distribution time in network)+(protection time α)". Since this time estimation may be cumbersome in the actual network operation, a sufficiently long time may be set as the predetermined time in consideration of the worst case.

When the predetermined time T on the superpacket forming section 205 side is defined not by the minimum band but by the delay time, as described above, the defined value of this delay time is used instead of the time determined by the minimum band.

Finally, the packet segmenting section 16 segments each IP packet transferred from the read control section 505 into fixed-length device cells and sends them to the switch section 203. Simultaneously, the packet segmenting section 16 notifies the switch section 203 of one of the access interface sections 202-1 to 202-M, to which the transferred IP packet is to be transferred.

In this embodiment, the above-described mechanism enables operation of the fixed-length superpacket 110 in the network 106 and also enables operation at a link utilization efficient of 100% without any free band by inserting IP packets into the switch scheduler section 12 of the superpacket 110.

(4) Description of Operation

Figure 13:
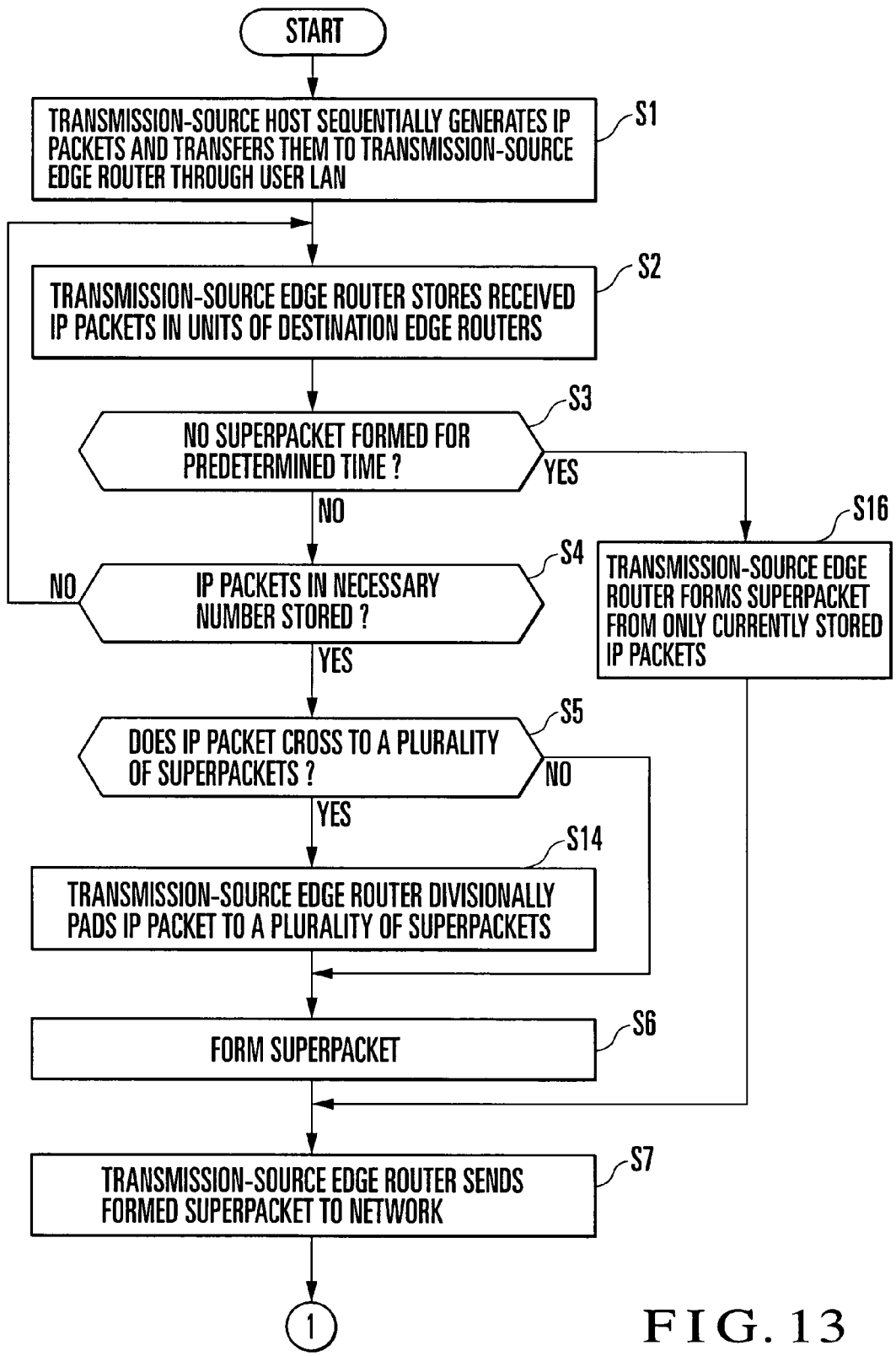
FIG. 13 is a first flow chart showing the schematic operation in the packet communication system according to the embodiment of the present invention.
Figure 14:
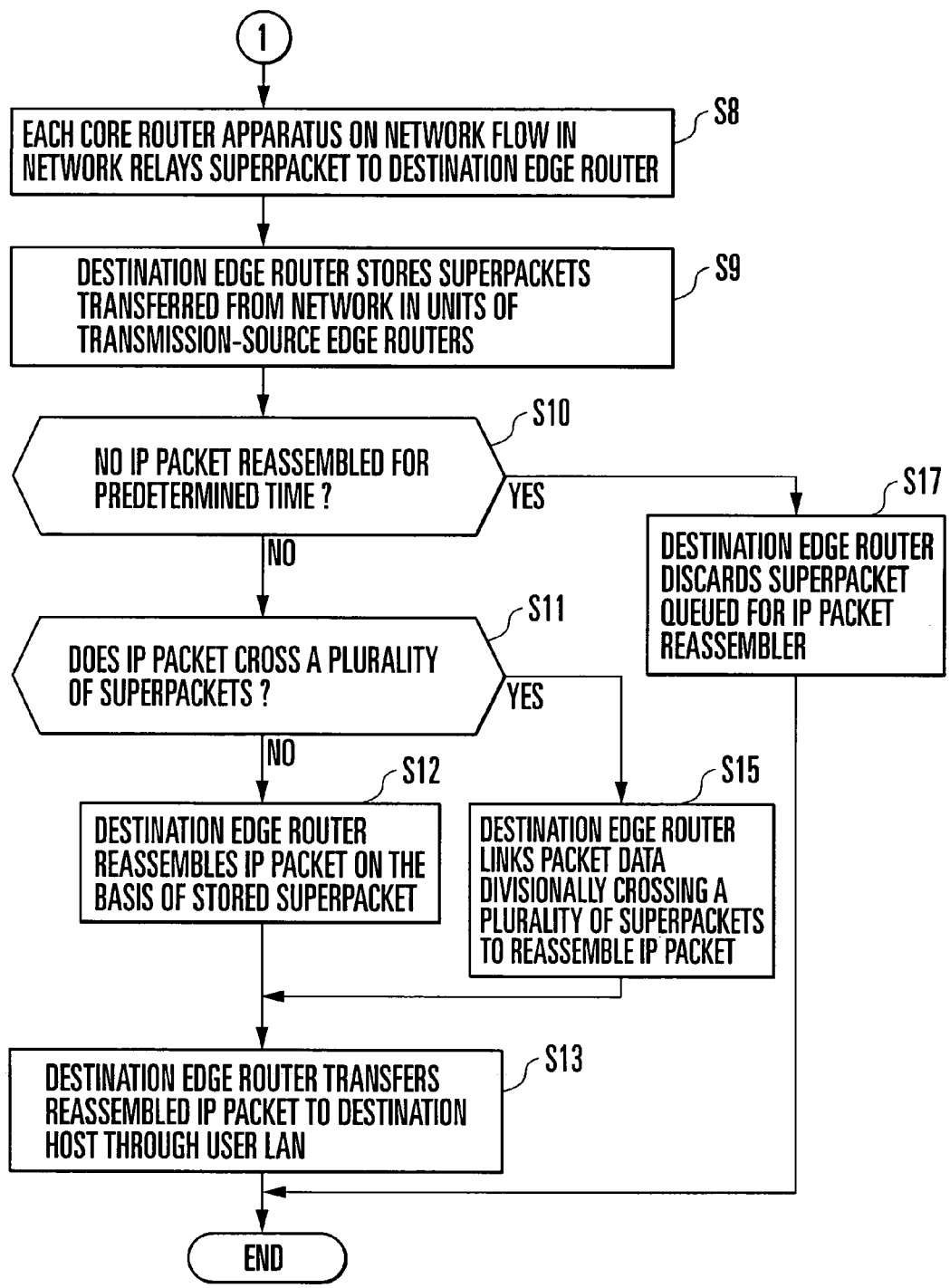
FIG. 14 is a second flow chart showing the schematic operation in the packet communication system according to the embodiment of the present invention.

The operation of each section in the network having the above arrangement will be described next in detail with reference to the flow charts shown in FIGS. 13 and 14. A process will be described below, in which, as shown in FIG. 1, a layer 1 frame containing the IP packet 37 generated by the transmission-source host 105c is converted into a layer 1 frame containing the superpacket 110 by the transmission-source edge router 101c having a network address "3", the layer 1 frame is relayed by the core router apparatus 102b with a network address "2" and core router apparatus 102d with a network address "9", converted into a layer 1 frame containing the original IP packet by the destination edge router 101g having a network address "7", and transferred to the destination host 105g.

First, the transmission-source host 105c belonging to the user LAN 104c generates and sends a layer 1 frame containing the IP packet 37. The user LAN 104c determines whether the received IP packet 37 is to be transferred through the network 106. If it is determined that the IP packet 37 is not to be transferred through the network 106, the user LAN 104c transmits the layer 1 frame containing the IP packet 37 to another host except the transmission-source host 105c connected to itself. In this case, assume that it is determined that the IP packet is to be transferred through the network 106.

Hence, the user LAN 104c transfers the layer 1 frame containing the IP packet 37 to the edge router apparatus 101c as a transmission-source edge router through the access line 103c. In the edge router apparatus 201 shown in FIG. 7, that corresponds to the edge router apparatus 101c, the layer 1 frame containing the IP packet 37 is input to one of the access interface sections 202-1 to 202-M, which is connected to the access line 103c (step S1).

When the layer 1 frame containing the IP packet 37 is input, the same operation as described in the prior art is executed first. More specifically, the access interface section sequentially executes layer 1 processing and layer 2 processing for the layer 1 frame containing the IP packet 37 to extract the IP packet 37, executes IP layer processing for the extracted IP packet 37, segments the IP packet 37 into fixed-length device cells, and transfers them to the switch section 203. At the same time, the access interface section searches for path information in accordance with the destination address contained in the header-portion of the IP packet 37 to specify the core router apparatus 102b as a destination to which the IP packet is to be transferred next, specifies one of the superpacket processing sections 204-1 to 204-P, which is connected to the core router apparatus 102b, and notifies the switch section 203 of it.

The switch section 203 calculates an appropriate combination of switch connections in the internal crossbar switch section (having the same arrangement as in FIG. 16), and transfers, to the crossbar switch section, the device cells transferred from the access interface section. Thus, the device cells are sequentially input to the superpacket forming section 205 in the specified superpacket processing section through the crossbar switch section.

In the superpacket forming section 205 in the edge router apparatus 101c, the packet reassembler section 18 shown in FIG. 8 stacks the device cells switched by the switch section 203 to reassemble the IP packet 37, and sends it to the destination edge router determination section 301. The destination edge router determination section 301 searches the address solution table 308 on the basis of the destination IP address contained in the header portion of the IP packet 37 sent from the packet reassembler section 18 to solve the address and determine the destination edge router in the network 106, to which the IP packet 37 is to be transferred. In addition, the destination edge router determination section 301 determines the route to transfer the IP packet 37 to the destination edge router. The destination edge router determination section 301 acquires, from the address solution table 308, the network address "7" of the destination edge router 101g to which the superpacket 110 is to be finally transferred in the network 106, and transfers the network address value to the write control section 302 together with the received IP packet 37.

The write control section 302 writes the IP packet 37 transferred from the destination edge router determination section 301 in a queue on the buffer section 304, which corresponds to the network address of the destination edge router 101 (step S2). Simultaneously, the write control section 302 looks up the total length described in the header of the IP packet 37 and notifies the read control section 303 of the packet length of the IP packet 37 together with the destination edge router address value "7". Every time a layer 1 frame containing the IP packet 37 is sent from the transmission-source host 105c, the packet reassembler section 18, destination edge router determination section 301, and write control section 302 repeat the above-described operation ("NO" in steps S3 and S4) to store the IP packets 37 in the queue on the buffer section 304.

The read control section 303 monitors the queue length related to each queue on the buffer section 304. For a queue whose length has reached the superpacket length ("YES" in step S4), IP packets on the queue are transferred as a superpacket. More specifically, the read control section 303 reads out IP packets corresponding to the superpacket length "n×L" from a queue whose length has reached the superpacket length (step S6 after "NO" in step S5). More exactly, IP packets corresponding to a length obtained by subtracting a length necessary for the packet header 111 and fields ① to ④ from the superpacket length are read out from a queue, as described above.

Next, the read control section 303 regards the IP packets read out from the buffer section 304 as the packet payload 112, attaches the packet header 111 to the start of the packet payload 112 to convert the IP packets into a frame of superpacket 110, and also stores the destination edge router address (i.e., "7") and transmission-source edge router address (i.e., "3") in the destination address field and transmission-source address field on the packet header 111, respectively. The read control section 303 also writes a pointer value representing the start position of the first IP packet on the packet payload 112 in the pointer field ① on the packet payload 112. The read control section 303 also writes the number of IP packet start positions on the packet payload 112 in the packet count field ② on the packet payload 112.

In addition, the read control section 303 sets the padding ON/OFF field ③ to "padding ON" or "padding OFF" in accordance with whether the final IP packet in the packet payload 112 crosses a plurality of superpackets ("YES" or "NO" in step S5). Furthermore, when the entire packet payload 112 of the formed superpacket 110 is occupied by data of the single IP packet 37 (FIG. 6), the read control section 303 sets the single packet occupation field ④ on the packet payload 112 to "ON"; otherwise, the single packet occupation field ④ is set to "OFF". The read control section 303 transfers the formed superpacket 110 to the layer 1/layer 2 processing section 307.

The IP packet has a variable length while the superpacket has a fixed length. For this reason, when the read control section 303 has extracted from a queue IP packets corresponding to the superpacket length (more exactly, the above-described length), the IP packet to be finally inserted may partially remain on the queue [packet PA or PF in FIG. 5A]. In this case, the read control section 303 segments the IP packet, forms the superpacket A1 from the IP packet data including the former half of the packet PF shown in FIG. 5A, and leaves the remaining portion of the packet PF on the queue for the use for subsequent formation of the superpacket A2 (step S14). In this case, the read control section 303 calculates the length of the remaining portion left on the queue and causes the pointer section 306 to hold it. If no remaining portion is present, the read control section 303 stores "0" in the pointer section 306. Thus, the remaining portion length [length L2 in FIG. 5A] held by the pointer section 306 is used as the value of pointer field ① of the superpacket [corresponding to the superpacket A2 in FIG. 5A] to be formed next.

For a queue whose length does not readily reach the superpacket length (more exactly, the above-described length) because of little traffic, the read control section 303 does not form a superpacket even after the elapse of predetermined time T or more. The timer in the timer section 305, which has started time counting after the previous superpacket formation by the read control section 303 has timed out when the predetermined time T has elapsed ("YES" in step S3). As a result, the timer section 305 notifies the read control section 303 of the destination edge router address corresponding to this queue timed out.

Even when the length of the queue designated by the destination edge router address has not reached the superpacket length (more exactly, the above-described length), the read control section 303 forcibly forms the superpacket 110 from IP packets stored in this queue, as in the above-described case (step S16). In this case, since the superpacket 110 always has a free region, the read control section 303 sets the padding ON/OFF field ③ on the packet payload 112 to "padding ON". The read control section 303 also instructs the timer section 305 to cause the timer corresponding to the time-out queue to start time counting from zero again.

Upon receiving the superpacket 110 from the read control section 303, the layer 1/layer 2 processing section 307 attaches the necessary layer 1 header 31, layer 2 header 34, and layer 2 trailer 35 to the superpacket 110 to form a layer 1 frame and transfers it to the transmission path 100 (step S7). Thus, the layer 1 frame containing the superpacket 110 is sent from the transmission-source edge router 101c to the network 106 and transferred to the core router apparatus 102b through the transmission path 100. The core router apparatus 102b transfers the layer 1 frame to the core router apparatus 102d in accordance with the destination edge router address in the destination address field described in the packet header 111 of the superpacket 110 contained in the layer 1 frame transferred from the edge router apparatus 101c.

The core router apparatus has the same arrangement as that of the router apparatus described in the prior art. For the core router apparatus, the superpacket 110 contained in the layer 1 frame looks like the normal IP packet 37. Hence, the core router apparatus 102b transfers the layer 1 frame containing the superpacket 110 to the core router apparatus 102d in the same way as described in the prior art. In the router apparatus of this embodiment, however, switch operation occurs only every superpacket unit or superpacket length (=length "n×L"), unlike the conventional router apparatus in which switch operation occurs every device cell unit or fixed length L. For this reason, in this embodiment, the number of times of switching can be decreased to 1/n as compared to the prior art. The core router apparatus 102d also transfers the received layer 1 frame to the edge router apparatus 101g in accordance with the same procedure as in the core router apparatus 102b. Thus, the layer 1 frame containing the superpacket 110 arrives at the destination edge router 101g through the above-described relays (step S8).

In the destination edge router 101g, the layer 1 frame containing the superpacket 110 is input to the superpacket reassembler section 206 of one of the superpacket processing sections 204-1 to 204-P through the transmission path 100. In the superpacket reassembler section 206, first, the layer 1/layer 2 processing section 501 terminates the layer 1 frame and transfers the superpacket 110 obtained by this termination processing to the destination edge router determination section 502. The destination edge router determination section 502 looks up the destination edge router address described in the destination address field in the packet header 111 of the received superpacket 110 and compares the destination edge router address with the self edge router address (i.e., "7"). Since incoincidence between the two addresses means that the superpacket 110 has been transferred by erroneous routing, the destination edge router determination section 502 discards the received superpacket 110. In this case, however, since the two addresses coincide, the destination edge router determination section 502 directly transfers the received superpacket 110 to the write control section 503.

The write control section 503 looks up the packet header 111 of the received superpacket 110 and writes the received superpacket 110 in a queue on the buffer section 504, which corresponds to the transmission-source edge router address described in the transmission-source address field (step S9). Simultaneously, the write control section 503 looks up the fields ① to ④ contained in the packet payload 112 of the superpacket 110, generates information related to the number of IP packets contained in the superpacket 110 written in the queue on the buffer section 504, and the presence/absence of a packet "queued for IP packet reassembler processing" (to be referred to as a "queued packet" hereinafter) corresponding to the packet PF contained in the superpacket A1 shown in FIG. 5A, and supplies the pieces of information to the read control section 505.

On the basis of the pieces of information supplied from the write control section 503, the read control section 505 sequentially extracts the IP packets from the superpacket 110 stored in the queue on the buffer section 504 and transfers the IP packets to the packet segmenting section 16 (step S12 after "NO" in steps S10 and S11). At this time, the read control section 505 specifies the start position of each IP packet in accordance with the pointer field ① and packet count field ② on the packet payload 112, and the total length described in the header of each IP packet and extracts the IP packets. The packet segmenting section 16 segments each IP packet transferred from the read control section 505 into device cells and sends them to the switch section 203. When the transmission-source edge router 101c has forcibly formed a superpacket because of time out, the padding ON/OFF field ③ in the packet payload 112 of the superpacket 110 is "padding ON". In this case as well, the same processing as described above is performed.

Upon detecting a queued packet in the process of extracting IP packets from the superpacket (NO in step S10 and "YES" in step S11), the read control section 505 does not immediately read out this queued packet or keeps it stored in the queue on the buffer section 504. This IP packet is reassembled after the superpacket [superpacket A2 in FIG. 5A] following the superpacket currently under processing [superpacket A1 in FIG. 5A] has arrived (step S15). More specifically, When the superpacket A1 is received, the read control section 505 removes the packet PA divisionally crossing the previous superpacket, sequentially extracts the packets PB to PE, and sends them to the packet segmenting section 16.

For the packet PF, the read control section 505 keeps the data in the region with the length L1 on the queue of the buffer section 504. When the superpacket A2 is received, the read control section 505 extracts data from the position immediately after the pointer field ① to the position immediately before the position indicated by this field (i.e., region with the length L2), links this data to the end of data with the length L1, which is held on the buffer section 504, to reassemble the original packet PF, and transfers the packet PF to the packet segmenting section 16.

In this case, if the superpacket A2 is discarded midway along the network flow 107, the read control section 505 does not reassemble the queued packet. However, every time an IP packet is extracted by the read control section 505, the timer section 506 restarts time counting by the internal timer corresponding to the queue to which the IP packet belongs. For this reason, when this timer has timed out, the timer section 506 notifies the read control section 505 of it together with the transmission-source edge router address corresponding to the timer ("YES" in step S10).

Consequently, the read control section 505 discards the queued packet remaining in the queue on the buffer section 504, which corresponds to the transmission-source edge router address (step S17). After this, when the read control section 505 starts extracting IP packets from a new superpacket stored in the time-out queue, the timer section 506 causes the timer corresponding to the queue to start time counting from zero again. In this embodiment, this arrangement prevents waste packets from remaining in a queue on the buffer section 504.

Each IP packet transferred from the read control section 505 in the superpacket reassembler section 206 is segmented into device cells by the packet segmenting section 16 and input to the switch section 203 shown in FIG. 7. After that, the same operation as described in the prior art is performed. More specifically, the packet segmenting section 16 segments each IP packet transferred from the read control section 505 into device cells and sends them to the switch section 203. At the same time, the packet segmenting section 16 determines the transfer destination of the IP packet from the access interface sections 202-1 to 202-N and notifies the switch section 203 of it. In this case, the user LAN 104g is specified as the transfer destination to which the IP packet is to be transferred next, so one of the access interface sections 202-1 to 202-N, which is connected to the user LAN 104g, is specified.

The switch section 203 stores the received device cells 40 in an internal memory (not shown) provided in units of access interface sections. The switch section 203 also calculates an appropriate commination of switch connections in the internal crossbar switch section and transfers the device cells 40 forming the IP packet to the crossbar switch section.

The device cells 40 are sequentially transferred to one of the access interface sections 202-1 to 202-N, which is connected to the access line 103g, through the crossbar switch section.

The access interface section stores the received device cells 40 in an internal memory provided in units of superpacket processing sections and stacks the device cells 40 to reassemble the original IP packet. After this, the access interface section sequentially executes IP layer processing, layer 2 processing, and layer 1 processing for the reassembled IP packet to form a layer 1 frame containing the IP packet, and transfers the layer 1 frame to the user LAN 104g through the access line 103g. The user LAN 104g determines the transfer destination of the IP packet contained in the layer 1 frame transferred from the edge router apparatus 101g, and consequently, transfers the layer 1 frame to the destination host 105g (step S13).

In the above-described manner, the transmission-source edge router 101c receives a layer 1 frame containing an IP packet generated by the transmission-source host 105c through the user LAN 104c, and, instead of directly transferring the layer 1 frame to the network 106, converts it into the superpacket 110 defined only in the network 106 and transmits the superpacket 110 in the form of layer 1 frame on the network flow 107. This superpacket 110 is relayed to the destination edge router 101g through core router apparatuses arranged in the network 106, as in a case wherein a normal IP packet is transferred in a network. The destination edge router 101g reassembles the superpacket 110 transferred through the network 106 into the original IP packet and transfers it from the user LAN 104g to the destination host 105g.

As described above in detail, in this embodiment, an IP packet transferred from each user LAN is padded in a superpacket having a fixed length n-times (n: a natural number of 2 or more) larger than the conventional device cell and then transferred to the network. For this reason, the switching unit of the edge router apparatus or core router apparatus in the network can be increased from the device cell length to the superpacket length. This solves the above-described first problem of prior art.

More specifically, conventionally, since the length of the device cell as a switching unit of the crossbar switch section is small, the calculation time of the scheduler for switch connection to be performed by the crossbar switch section also becomes short. For this reason, the switching scale of a router apparatus cannot be made large. To the contrary, in this embodiment, the device cell size itself can be actually increased to the superpacket length. Hence, even when the number of input interfaces or output interfaces increases, a sufficient switch connection calculation time (transfer time unit) can be ensured, and consequently, the switching capacity of a router apparatus can be increased. In addition, since the transfer time unit can be made large, the switch connection calculation time can be ensured even when the link speed increases, so switching in the router apparatus can be expanded.

In this embodiment, since the size of a packet transferred on the network is increased to the superpacket length, the second problem of prior art can also be solved. More specifically, this prior-art problem occurs because the minimum length of an IP packet transferred on the network is smaller than the length of the device cell as a transfer unit in the router apparatus. In this embodiment, the minimum length of a packet transferred on the network is increased to the superpacket length, i.e., made sufficiently larger than the minimum length of an IP packet, thereby avoiding the above-described problem.

In this embodiment, since the length of a superpacket transferred on the network is an integer multiple of device cell, the third problem of prior art can also be solved. More specifically, this prior-art problem occurs because the length of the variable-length IP packet transferred on the network is not always an integer multiple of the length of the fixed-length device cell, and therefore, the final device cell obtained by segmenting the IP packet into device cells has a free region. In this embodiment, however, even when the superpacket is segmented into device cells, the segmented device cell has no free region, and the conventional problem can be prevented.

According to this embodiment, a large-scale router apparatus can be constructed, and the number of IP packets to be transferred on the network can be greatly increased.

In the above description, the edge router apparatus 101c functions as a transmission-source edge router, and the edge router apparatus 101g functions as a destination edge router. However, all edge router apparatuses have both the transmission-source edge router function and destination edge router function.

In this embodiment, a description has been made for a limited form, i.e., an IP packet. However, in place of an IP packet, an ATM cell or STM frame may be used. An ATM cell or STM frame has the same format as that of the IP packet, i.e., address information in the header portion. When the IP packet in the above description is replaced with an ATM cell or STM frame, a packet communication system can be implemented using the same arrangement as that for the IP packet except the points to be described below.

For an ATM or STM traffic, for example, all the packets PA to PF padded in the superpacket 110 shown in FIG. 3 have a fixed length. In addition, since the ATM cell or STM frame has a fixed length, the cell or frame has no cell length or frame length field inside. To obtain the start position of each cell or frame on the packet payload 112, information associated with the length of the ATM cell or STM frame is defined in advance in the edge router apparatus such that the edge router apparatus can recognize the start position of each ATM cell or STM frame on the basis of the information.

A plurality of types of cells, packets, and frames, including an IP packet, ATM cell, and STM frame, can be transferred by the following method. The Egress router recognizes the type of traffic contained in the superpacket transferred from the network 106, i.e., IP packets, ATM cells, or STM frames, and then returns them to the user LAN. If a plurality of access networks are connected to each Egress router in units of traffic types (IP/ATM/STM), or an Egress router need process even identical traffics in different manners depending on the queue stay time or priority control, different network addresses are assigned to these traffics. This allows, e.g., the Egress router to determine the traffic type from the three traffic types on the basis of the network address value of the destination address described in the packet header 111 of the superpacket 110 and execute individual processing corresponding to the traffic type.

Additionally, when the traffic is, e.g., STM, the network flow 107 shown in FIG. 1 is CBR (Continuous Bit Rate), and the pointer field ① shown in FIG. 3 indicates the start position of an STM frame padded in the superpacket 110.

In the above description, each edge router apparatus incorporates a switch section. The present invention is not limited to this, and the functional block for switching a packet or frame and that for superpacket construction/reassembler may be implemented by independent devices.

As has been described above, in the present invention, a fixed-length packet having a size larger by a plurality of times than a fixed-length cell as a switching unit for packet relay on a network is defined as a superpacket, and a packet generated by a transmission-source access network is converted into a superpacket and sent to the network. In addition, the packet inserted into the superpacket from the network is extracted to reassemble the original packet generated by the transmission source, and the reassembled packet is sent to the destination access network. Conventionally, a packet transferred on the network has a variable length. In the present invention, however, the packet is guaranteed to have a fixed length corresponding to the superpacket length. For this reason, the switching unit of a relay means arranged at a relay point on the network can actually be increased from the conventional device cell size to the superpacket size. Even when the number of input/output interfaces of the relay means increases, a sufficient time can be ensured for calculation of switch connection setting, and the switching capacity can be increased. In addition, since the transfer time in the relay means can be increased, a sufficient time for calculation of switch connection setting can be ensured even when the link speed becomes high, and switching can be expanded. Furthermore, since the number of times of switching decreases as the superpacket length becomes large, the scale of relay means can be made large accordingly.

In this embodiment, to form a superpacket, packets are stored in a queue prepared in each packet transfer apparatus on the destination side. When a number of packets necessary for superpacket formation are stored, the packets are extracted from the queue to form a superpacket. For this reason, a superpacket associated with packets to be transferred to each destination can be efficiently formed on a queue managed in units of destinations.

In the present invention, when a first time count means for starting time counting every time a superpacket is formed detects the elapse of a first time-out time, and at this time, packets are stored in a queue corresponding to the time count means, a superpacket is formed on the basis of these packets. Hence, even when a superpacket is not readily formed due to little traffic, a superpacket is always sent to the network when the first time-out time has elapsed. This prevents packets from staying forever in the transmission-source packet transfer apparatus without forming a superpacket.

In the present invention, since the first time-out time is determined from the minimum band for each traffic on the network, the minimum band can always be guaranteed even for little traffic.

In the present invention, since the first time-out time is determined from the allowable network delay for each traffic on the network, network transfer can be guaranteed to complete within the first time-out time.

In the present invention, to reassemble a packet, superpackets are stored in a queue prepared for each packet transfer apparatus on the transmission source side, and the packet generated by the transmission-source packet transfer apparatus is reassembled from the superpacket stored in the queue. For this reason, the packet transfer apparatus on the destination side can manage packets individually sent from the transmission-source packet transfer apparatus side in units of transmission sources. Hence, even a packet crossing a plurality of superpackets can also be efficiently reassembled.

In the present invention, when a second time count means for starting time counting every time a packet is reassembled detects the elapse of a second time-out time, and at this time, a superpacket is staying in a queue corresponding to the time count means, the superpacket is discarded. Hence, even when a packet crosses a plurality of superpackets and is transferred on the network, and some superpackets are discarded on the network, already transferred superpackets are prevented from staying on the queue because the packet cannot be reassembled in the destination-side packet transfer apparatus forever. This prevents waste packets from remaining on the queue.

In the present invention, the second time-out time is determined on the basis of the minimum band or maximum allowable value of network delay of traffic on the network, delay distribution time in the network, or a prescribed protection time. For this reason, the minimum band or maximum network delay time can be guaranteed. Additionally, even when congestion or jitter occurs in the network, the minimum band or maximum network delay time can be guaranteed.

In the present invention, to form superpacket on the transmission-source packet transfer apparatus side, it is detected that a packet crosses a plurality of superpackets, and the packet is divisionally stored in a plurality of superpackets. To reassemble a packet on the destination packet transfer apparatus side, it is detected that a packet on the superpacket crosses the plurality of superpackets, and packet data divisionally stored in the plurality of superpackets are connected to reassemble the original packet generated by the transmission-source access network. For this reason, regardless of the length of a packet padded in the superpacket, the superpacket never has a free region. Hence, the original packet can be accurately reassembled on the destination packet transfer apparatus side while operating the network at a link efficiency of 100% without any free band.

In the present invention, single packet occupation information representing whether the payload of a superpacket is occupied by data of a single packet is described on the superpacket. In forming the superpacket on the transmission-source packet transfer apparatus side, the single packet occupation information is set by comparing each packet length with the payload length of the superpacket. On the destination packet transfer apparatus side, when it is detected that the single packet occupation information is "ON", packet data inserted into a series of superpackets until the arrival of the superpacket with the information "OFF" are linked to reassemble the original packet generated by the transmission-source access network. Hence, even when a single packet is longer than a superpacket, and the packet is divisionally transferred using a number of superpackets, they can be transferred on the network without any free band, and the original packet can be accurately reassembled on the destination packet transfer apparatus side.

In the present invention, the header of a superpacket has the same format as that of a conventional packet such as an IP packet. For this reason, the relay means arranged in the network can be implemented by the same arrangement as that of a conventional router. That is, since the conventional router can be used as the relay means, a packet communication system operated using superpackets can be constituted by newly developing and installing the above-described packet transfer apparatus only at a connection portion between the network and the access network.

In the present invention, unique network addresses defined only in the network are assigned to the packet transfer apparatuses and relay means. Network addresses assigned to the transmission-source and destination packet transfer apparatuses are stored in the transmission-source and destination addresses described in the header of a superpacket. For this reason, in the network, operation is enabled using only the network addresses without looking up the destination address such as an IP address contained in the header portion of each packet.

In the present invention, for superpackets addressed to the same destination packet transfer apparatus, different network addresses are assigned to destination addresses in the headers of superpackets in accordance with the access network types of the destination. Hence, various networks including an existing general access network, ATM network, and STM network can be simultaneously connected to each packet transfer apparatus. Even when the same traffic or access network type must be processed in a different manner depending on the queue stay time or priority control, for example, the destination packet transfer apparatus can perform individual processing operations in accordance the destination address in the superpacket.

In the present invention, the relay means in the network has a route search table having entries in number corresponding to the numbers of packet transfer apparatuses and relay means. The table is searched on the basis of the destination address in the header of a superpacket to specify the relay destination. Unlike the conventional IP router apparatus which requires a route search table corresponding to all destination IP addresses, a route search table having entries in number corresponding to a small number of network addresses defined in the network suffices, so the arrangement scale can be made smaller than the prior art.

In the present invention, superpackets have the same header as far as the network flow as a traffic from the transmission-source packet transfer apparatus to the destination packet transfer apparatus is the same. For this reason, a series of superpackets transferred in units of network flows as traffic flows in the network can be uniquely identified.

What is claimed is:

1. A packet transfer method comprising:
   causing a transmission-source access network to generate at least one packet to be transferred to a destination access network, and to transmit said at least one packet to a transmission-source packet transfer apparatus connected to said transmission-source access network;
   causing said transmission-source packet transfer apparatus to convert said at least one packet into a superpacket having a length n times (n is an integer of not less than 2) larger than a fixed-length cell, said superpacket serving as a switching unit of relay means arranged on a network, and to send the superpacket to said network;
   causing said network to relay the superpacket using said relay means, and to transfer the superpacket to a destination packet transfer apparatus connected to said destination access network; and
   causing said destination packet transfer apparatus to reassemble said at least one packet generated by said transmission-source access network on the basis of the superpacket transferred from said network, and to send said at least one packet to said destination access network,
   wherein when said at least one packet cannot fit the superpacket, the forming means places a portion of the packet into the superpacket and another portion of the packet into another superpacket, and
   wherein, when the superpacket is occupied with a single packet or a portion of the single packet, the forming means sets a single packet occupation field to ON.

2. A method according to claim 1, further comprising:
   causing said transmission-source packet transfer apparatus to individually store the transmitted packets by their respective destination transfer apparatuses, forming the superpacket for each of said destination packet transfer apparatuses, and sending the superpacket to said network, and causing said destination packet transfer apparatus to individually store the superpackets transferred from said network by their respective transmission-source packet transfer apparatuses and reassembling the packet for each of said transmission-source packet transfer apparatuses.

3. A method according to claim 2, further comprising:
causing said transmission-source packet transfer apparatus to detect for each of said destination packet transfer apparatus that the superpacket is not formed for a first time-out time, and if a packet is stored in association with said destination packet transfer apparatus and the superpacket is not formed for said first time-out time, causing said transmission-source packet transfer apparatus to form the superpacket from the packet and to send the superpacket to said network.

4. A method according to claim 2, further comprising:
causing said destination packet transfer apparatus to detect for each of said transmission-source packet transfer apparatus that the packet is not reassembled for a second time-out time, and if a superpacket is stored in association with said transmission-source packet transfer apparatus without reassembly for said second time-out time, causing said destination packet transfer apparatus to discard the superpacket.

5. A method according to claim 1, further comprising:
when the packet transmitted from said transmission-source access network crosses a plurality of superpackets, said transmission-source packet transfer apparatus divisionally sends the packet to said network using the plurality of superpackets, and when the packet is transferred from said network in said plurality of superpackets, said destination packet transfer apparatus reassembles the transmitted packet by connecting said plurality of superpackets and then sending the reassembled packet to said destination access network.

6. A method according to claim 1, further comprising:
causing said transmission-source packet transfer apparatus to store, as a transmission-source address and destination address in a header of the superpacket, unique network addresses defined only in said network and assigned to said transmission-source packet transfer apparatus and said destination packet transfer apparatus, respectively, and send the superpacket to the network, and causing each relay means in the network to look up the header of the transferred superpacket to specify a relay destination of the superpacket in accordance with the network address assigned to said destination packet transfer apparatus and transfer the superpacket to said destination packet transfer apparatus.

7. The method according to claim 1, wherein said forming means is configured to assemble the superpacket having a fixed length from a plurality of packets of variable lengths.

8. The method according to claim 7, wherein the superpacket is filled up so that no available region is left unless a time-out occurs forcing the transmission-source apparatus to transmit the superpacket without being filled up with data stored in said at least one packet, and wherein when the time-out occurs setting a padding information to ON to indicate presence of an available, data-free region.

9. The method according to claim 1, wherein the at least one packet is an IP packet in a digital IP network, wherein the superpacket is transmitted in the digital IP network, and wherein a header of the superpacket has same format as a header of the IP packet.

10. A packet transfer apparatus for transferring at least one packet between an access network for transmitting/receiving said at least one packet and a network serving as a backbone having relay means for relaying said at least one packet, comprising:

forming means for converting said at least one packet into a superpacket, the superpacket has a length n times (n is an integer of not less than 2) larger than a fixed-length cell, said superpacket serves as a switching unit of said relay means, and for sending the superpacket to said network; and reassembler means for extracting said at least one packet from the superpacket sent from said network and sending said at least one packet to said access network, wherein when said at least one packet cannot fit the superpacket, the forming means places a portion of the packet into the superpacket and another portion of the packet into another superpacket, and wherein, when the superpacket is occupied with a single packet or a portion of the single packet, the forming means sets a single packet occupation field to ON.

11. An apparatus according to claim 10, wherein said forming means comprises first storage means having queues for storing the packets, wherein the packets are stored by their respective packet transfer destination apparatus in the queues, and wherein said forming means detects the number of the stored packets, and when the number of stored packets is sufficient for forming the superpacket, said forming means extracts the packets from the queue to form the superpacket.

12. An apparatus according to claim 11, wherein said forming means further comprises:

for each of said queues of said first storage means, first time count means for starting time counting every time the superpacket is formed and detecting an elapse of a first time-out time from the time count start time, and when the elapse of the first time-out time is detected, said forming means forms the superpacket from the packets stored in the queue.

13. An apparatus according to claim 12, wherein the first time-out time is determined on the basis of a predetermined minimum band for each traffic on said network.

14. An apparatus according to claim 12, wherein the first time-out time is determined on the basis of a predetermined allowable network delay time for each traffic on said network.

15. An apparatus according to claim 10, wherein said reassembler means comprises second storage means having queues for storing the superpackets, wherein said superpackets are stored by their respective packet transfer source apparatus in the queue, and wherein said reassembler means reassembles the packet from the stored superpacket.

16. An apparatus according to claim 15, wherein said reassembler means comprises, for each queue on said second storage means, second time count means for starting to count time every time the packet is reassembled and for detecting an elapse of a second time-out from the time count, and wherein when the elapse of the second time-out time is detected, the reassembler means discards the superpacket from the queue.

17. An apparatus according to claim 16, wherein the second time-out is determined on the basis of a predetermined minimum band or maximum allowable value of at least one of a network delay for each traffic on said network, delay distribution time in said network, and predetermined protection time.

18. An apparatus according to claim 10, wherein said forming means detects that the packet crosses a plurality of superpackets and divisionally stores the packet in the plurality of superpackets, and said reassembler means detects that the packet on the superpacket crosses a plurality of superpacket and links packet data divisionally stored in the plurality of superpackets to reassemble the original packet generated by said transmission-source access network.

19. An apparatus according to claim 10, wherein a header of the superpacket has the same format as that of a header of the packet.

20. A packet transfer apparatus for transferring a packet between an access network for transmitting/receiving the packet and a network serving as a backbone having relay means for relaying the packet, comprising:
  forming means for converting the packet into a superpacket having a length n times (n is an integer of not less than 2) larger than a fixed-length cell, said superpacket serving as a switching unit of said relay means, and sending the superpacket to said network; and
  reassembler means for extracting the packet from the superpacket sent from said network and sending the packet to said access network,
  wherein:
    the superpacket stores single packet occupation information representing whether a payload of the superpacket is occupied by data of a single packet,
    said forming means compares a length of each packet with a length of the payload of the superpacket and sets the single packet occupation information to occupation ON or occupation OFF in accordance with a comparison result, and
    said reassembler means detects that the single packet occupation information on the superpacket represents occupation ON and links packet data on a series of superpackets until an arrival of the superpacket with the single packet occupation information representing occupation OFF to reassemble the original packet generated by said transmission-source access network.

21. A packet communication system comprising:
an access network for transmitting/receiving a packet;
a packet transfer apparatus for transmitting/receiving the packet;
relay means for relaying the packet; and
a network serving as a backbone for transferring a superpacket having a length n times (n is an integer of not less than 2) larger than a fixed-length cell, said superpacket serving as a switching unit of said relay means,
wherein said packet transfer apparatus converts the packet into the superpacket and visa versa, and further transfers the packet transmitted from a transmission-source access network to a destination access network in a form of the superpacket through said relay means in said network, and
wherein when the packet cannot fit the superpacket, the forming means places a portion of the packet into the superpacket and another portion of the packet into another superpacket, and
wherein, when the superpacket is occupied with a single packet or a portion of the single packet the forming means sets a single packet occupation field to ON.

22. A system according to claim 21, wherein
said packet transfer apparatus and said relay means are assigned unique network addresses defined only in said network, and
said network addresses of packet transfer apparatuses are stored in a header of the superpacket as a transmission-source address and a destination address.

23. A system according to claim 22, wherein for superpackets having the same destination packet transfer apparatus, different network addresses are assigned to destination addresses in headers of the superpackets in accordance with a type of destination access network connected to said destination packet transfer apparatus.

24. A system according to claim 22, wherein said relay means comprises:
  a route search table which stores a number of entries, said number of entries at least corresponding to a number of said packet transfer apparatuses and relay means, each of said entries connects a destination address in a header of the superpacket to a relay destination of the superpacket, and
  route search means for searching the route search table on the basis of the destination address in the header of the superpacket to find the relay destination of the superpacket.

25. A system according to claim 21, wherein for same network flow, said network flow comprises traffic through said relay means in said network, said traffic is transmitted from said packet transfer apparatus connected to said transmission-source access network, to said packet transfer apparatus connected to said destination access network, superpackets corresponding to the same network flow have the same header.

* * * * *